United States Patent [19]

Field, II

[11] 4,438,381
[45] Mar. 20, 1984

[54] SYNCHRONOUS MOTOR SYSTEM

[75] Inventor: John H. Field, II, Norfolk, Mass.

[73] Assignee: Sigma Instruments, Inc., Braintree, Mass.

[21] Appl. No.: 345,617

[22] Filed: Feb. 3, 1982

Related U.S. Application Data

[63] Continuation of Ser. No. 72,323, Sep. 4, 1979, abandoned, which is a continuation of Ser. No. 742,690, Nov. 17, 1976, Pat. No. 4,255,696, which is a continuation-in-part of Ser. No. 654,400, Feb. 2, 1976, abandoned.

[51] Int. Cl.³ .............................................. G05B 19/40
[52] U.S. Cl. .................................... 318/696; 318/711; 318/724; 318/777
[58] Field of Search ............... 318/696, 138, 711, 721, 318/722, 723, 724, 777, 810, 811

[56] References Cited

U.S. PATENT DOCUMENTS

| | | | |
|---|---|---|---|
| 3,453,510 | 7/1969 | Kreuter et al. | 318/696 |
| 3,967,174 | 6/1976 | Kogler et al. | 318/138 |
| 4,027,213 | 3/1977 | de Valroger | 318/138 |
| 4,029,977 | 6/1977 | Chai et al. | 318/696 |
| 4,044,291 | 8/1977 | Hughes et al. | 318/696 |

Primary Examiner—F. W. Isen
Attorney, Agent, or Firm—Toren, McGeady and Stanger

[57] ABSTRACT

A stepping motor with toothed stator poles and two sets of oppositely magnetized rotor teeth has its stator poles energized by a driver which responds to input pulses to successively deenergize alternate poles and keep them deenergized and then successively reenergize the alternate poles in the opposite direction. Thereafter the driver successively deenergizes the poles intermediate the alternate poles and keeps them deenergized until all intermediate poles are deenergized and then successively reenergizes the intermediate poles in the other direction until all the intermediate poles are reenergized. This drives the rotor in fractional steps. For larger fractional steps, larger numbers of poles are deenergized in response to each pulse. For even larger fractions the deenergization process is eliminated.

8 Claims, 29 Drawing Figures

8 PHASE BIPOLAR

| State | $Q_E$ | $Q_D$ | $Q_C$ | $Q_B$ | $Q_A$ | A1 | $\bar{A}2$ | B1 | B2 | C1 | $\bar{C}2$ | D1 | D2 | E1 | E2 | F1 | F2 | G1 | G2 | H1 | H2 |
|---|---|---|---|---|---|---|---|---|---|---|---|---|---|---|---|---|---|---|---|---|---|
| 0 | 0 | 0 | 0 | 0 | 0 | 1 | 0 | 1 | 0 | 1 | 0 | 1 | 0 | 1 | 0 | 1 | 0 | 1 | 0 | 1 | 0 |
| 1 | 0 | 0 | 0 | 0 | 1 | 1 | 0 | 1 | 0 | 1 | 0 | 0 | 0 | 1 | 0 | 1 | 0 | 1 | 0 | 1 | 0 |
| 2 | 0 | 0 | 0 | 1 | 0 | 1 | 0 | 1 | 0 | 0 | 0 | 0 | 0 | 1 | 0 | 1 | 0 | 1 | 0 | 1 | 0 |
| 3 | 0 | 0 | 0 | 1 | 1 | 1 | 0 | 0 | 0 | 0 | 0 | 0 | 0 | 1 | 0 | 1 | 0 | 1 | 0 | 1 | 0 |
| 4 | 0 | 0 | 1 | 0 | 0 | 0 | 0 | 0 | 0 | 0 | 0 | 0 | 0 | 1 | 0 | 1 | 0 | 1 | 0 | 1 | 0 |
| 5 | 0 | 0 | 1 | 0 | 1 | 0 | 0 | 0 | 0 | 0 | 0 | 0 | 1 | 1 | 0 | 1 | 0 | 1 | 0 | 1 | 0 |
| 6 | 0 | 0 | 1 | 1 | 0 | 0 | 0 | 0 | 0 | 0 | 1 | 0 | 1 | 1 | 0 | 1 | 0 | 1 | 0 | 1 | 0 |
| 7 | 0 | 0 | 1 | 1 | 1 | 0 | 0 | 0 | 1 | 0 | 1 | 0 | 1 | 1 | 0 | 1 | 0 | 1 | 0 | 1 | 0 |
| 8 | 0 | 1 | 0 | 0 | 0 | 0 | 1 | 0 | 1 | 0 | 1 | 0 | 1 | 1 | 0 | 1 | 0 | 1 | 0 | 1 | 0 |
| 9 | 0 | 1 | 0 | 0 | 1 | 0 | 1 | 0 | 1 | 0 | 1 | 0 | 1 | 1 | 0 | 1 | 0 | 1 | 0 | 0 | 0 |
| 10 | 0 | 1 | 0 | 1 | 0 | 0 | 1 | 0 | 1 | 0 | 1 | 0 | 1 | 1 | 0 | 1 | 0 | 0 | 0 | 0 | 0 |
| 11 | 0 | 1 | 0 | 1 | 1 | 0 | 1 | 0 | 1 | 0 | 1 | 0 | 1 | 1 | 0 | 0 | 0 | 0 | 0 | 0 | 0 |
| 12 | 0 | 1 | 1 | 0 | 0 | 0 | 1 | 0 | 1 | 0 | 1 | 0 | 1 | 0 | 0 | 0 | 0 | 0 | 0 | 0 | 0 |
| 13 | 0 | 1 | 1 | 0 | 1 | 0 | 1 | 0 | 1 | 0 | 1 | 0 | 1 | 0 | 0 | 0 | 0 | 0 | 0 | 0 | 1 |
| 14 | 0 | 1 | 1 | 1 | 0 | 0 | 1 | 0 | 1 | 0 | 1 | 0 | 1 | 0 | 0 | 0 | 0 | 0 | 1 | 0 | 1 |
| 15 | 0 | 1 | 1 | 1 | 1 | 0 | 1 | 0 | 1 | 0 | 1 | 0 | 1 | 0 | 0 | 0 | 1 | 0 | 1 | 0 | 1 |
| 16 | 1 | 0 | 0 | 0 | 0 | 0 | 1 | 0 | 1 | 0 | 1 | 0 | 1 | 0 | 1 | 0 | 1 | 0 | 1 | 0 | 1 |
| 17 | 1 | 0 | 0 | 0 | 1 | 0 | 1 | 0 | 1 | 0 | 1 | 0 | 0 | 0 | 1 | 0 | 1 | 0 | 1 | 0 | 1 |
| 18 | 1 | 0 | 0 | 1 | 0 | 0 | 1 | 0 | 1 | 0 | 0 | 0 | 0 | 0 | 1 | 0 | 1 | 0 | 1 | 0 | 1 |
| 19 | 1 | 0 | 0 | 1 | 1 | 0 | 1 | 0 | 0 | 0 | 0 | 0 | 0 | 0 | 1 | 0 | 1 | 0 | 1 | 0 | 1 |
| 20 | 1 | 0 | 1 | 0 | 0 | 0 | 0 | 0 | 0 | 0 | 0 | 0 | 0 | 0 | 1 | 0 | 1 | 0 | 1 | 0 | 1 |
| 21 | 1 | 0 | 1 | 0 | 1 | 0 | 0 | 0 | 0 | 0 | 0 | 1 | 0 | 0 | 1 | 0 | 1 | 0 | 1 | 0 | 1 |
| 22 | 1 | 0 | 1 | 1 | 0 | 0 | 0 | 0 | 0 | 1 | 0 | 1 | 0 | 0 | 1 | 0 | 1 | 0 | 1 | 0 | 1 |
| 23 | 1 | 0 | 1 | 1 | 1 | 0 | 0 | 1 | 0 | 1 | 0 | 1 | 0 | 0 | 1 | 0 | 1 | 0 | 1 | 0 | 1 |
| 24 | 1 | 1 | 0 | 0 | 0 | 1 | 0 | 1 | 0 | 1 | 0 | 1 | 0 | 0 | 1 | 0 | 1 | 0 | 1 | 0 | 1 |
| 25 | 1 | 1 | 0 | 0 | 1 | 1 | 0 | 1 | 0 | 1 | 0 | 1 | 0 | 0 | 1 | 0 | 1 | 0 | 1 | 0 | 0 |
| 26 | 1 | 1 | 0 | 1 | 0 | 1 | 0 | 1 | 0 | 1 | 0 | 1 | 0 | 0 | 1 | 0 | 1 | 0 | 0 | 0 | 0 |
| 27 | 1 | 1 | 0 | 1 | 1 | 1 | 0 | 1 | 0 | 1 | 0 | 1 | 0 | 0 | 1 | 0 | 0 | 0 | 0 | 0 | 0 |
| 28 | 1 | 1 | 1 | 0 | 0 | 1 | 0 | 1 | 0 | 1 | 0 | 1 | 0 | 0 | 0 | 0 | 0 | 0 | 0 | 0 | 0 |
| 29 | 1 | 1 | 1 | 0 | 1 | 1 | 0 | 1 | 0 | 1 | 0 | 1 | 0 | 0 | 0 | 0 | 0 | 0 | 0 | 1 | 0 |
| 30 | 1 | 1 | 1 | 1 | 0 | 1 | 0 | 1 | 0 | 1 | 0 | 1 | 0 | 0 | 0 | 0 | 0 | 1 | 0 | 1 | 0 |
| 31 | 1 | 1 | 1 | 1 | 1 | 1 | 0 | 1 | 0 | 1 | 0 | 1 | 0 | 0 | 0 | 1 | 0 | 1 | 0 | 1 | 0 |

⅛ STEP TRUTH TABLE
FOR ¼ STEP $Q_4$ ALWAYS EQUALS 0

FIG. 8

16 PHASE UNIPOLAR DRIVE WINDINGS

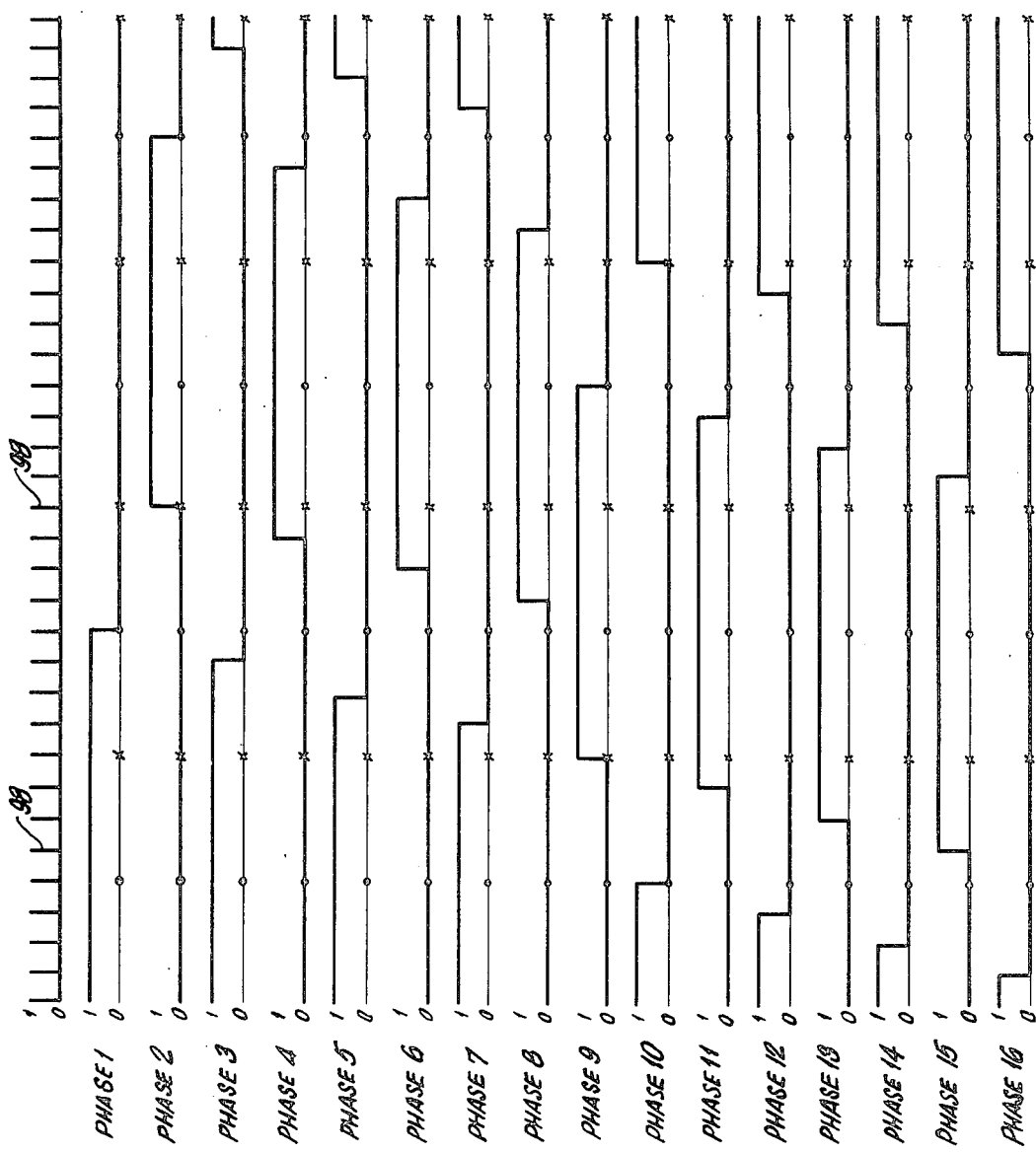

8 PHASE UNIPOLAR

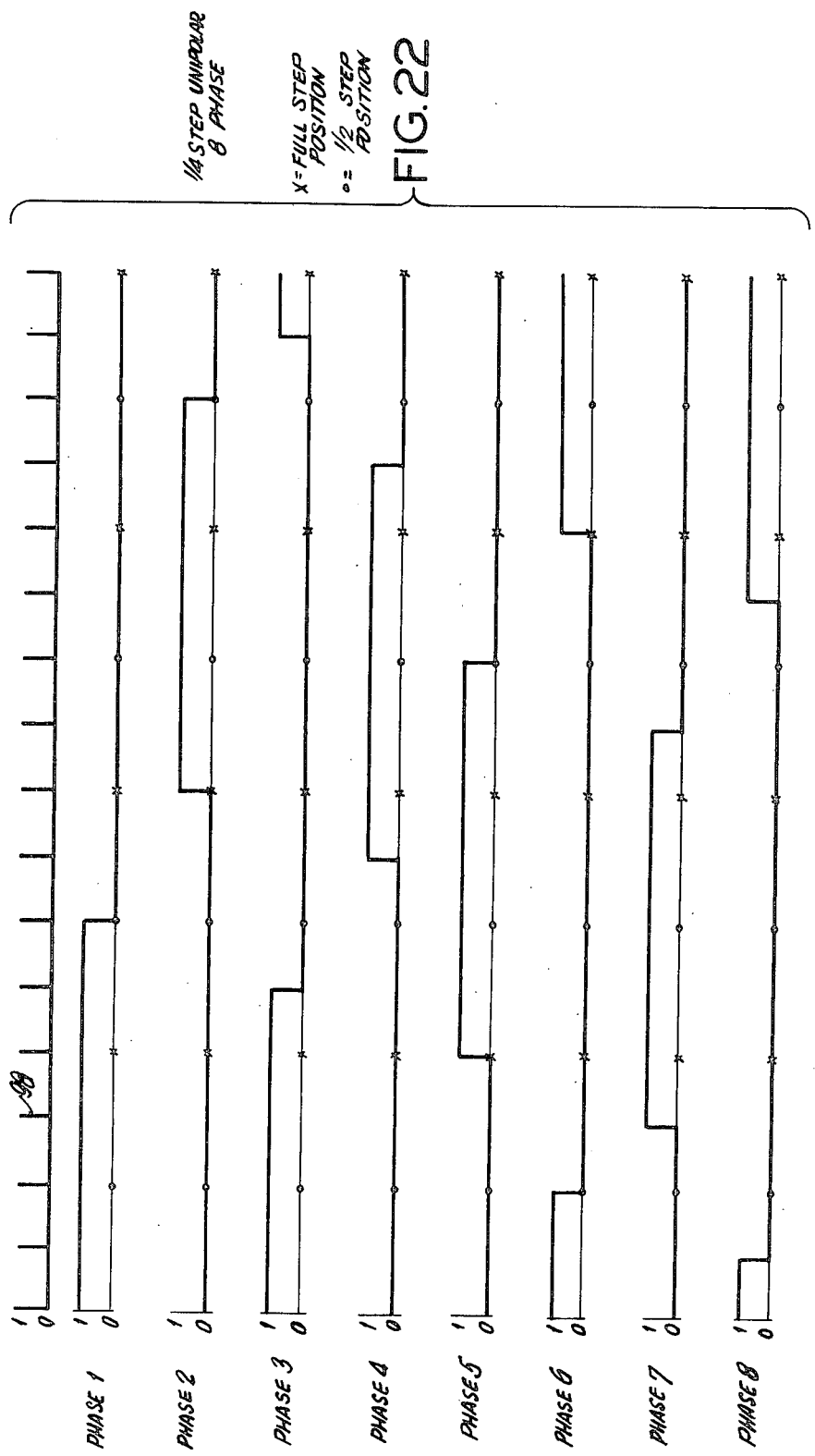

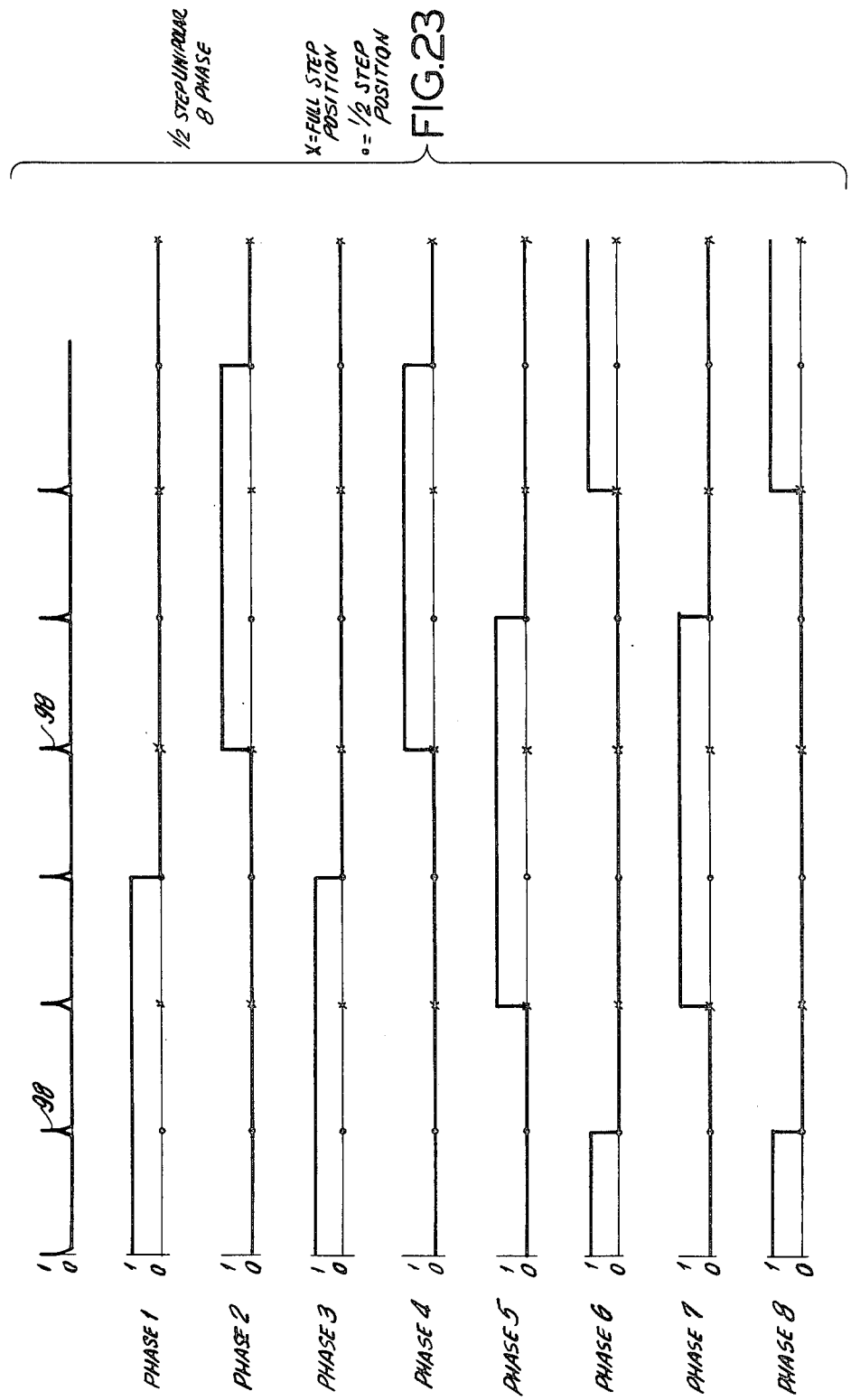

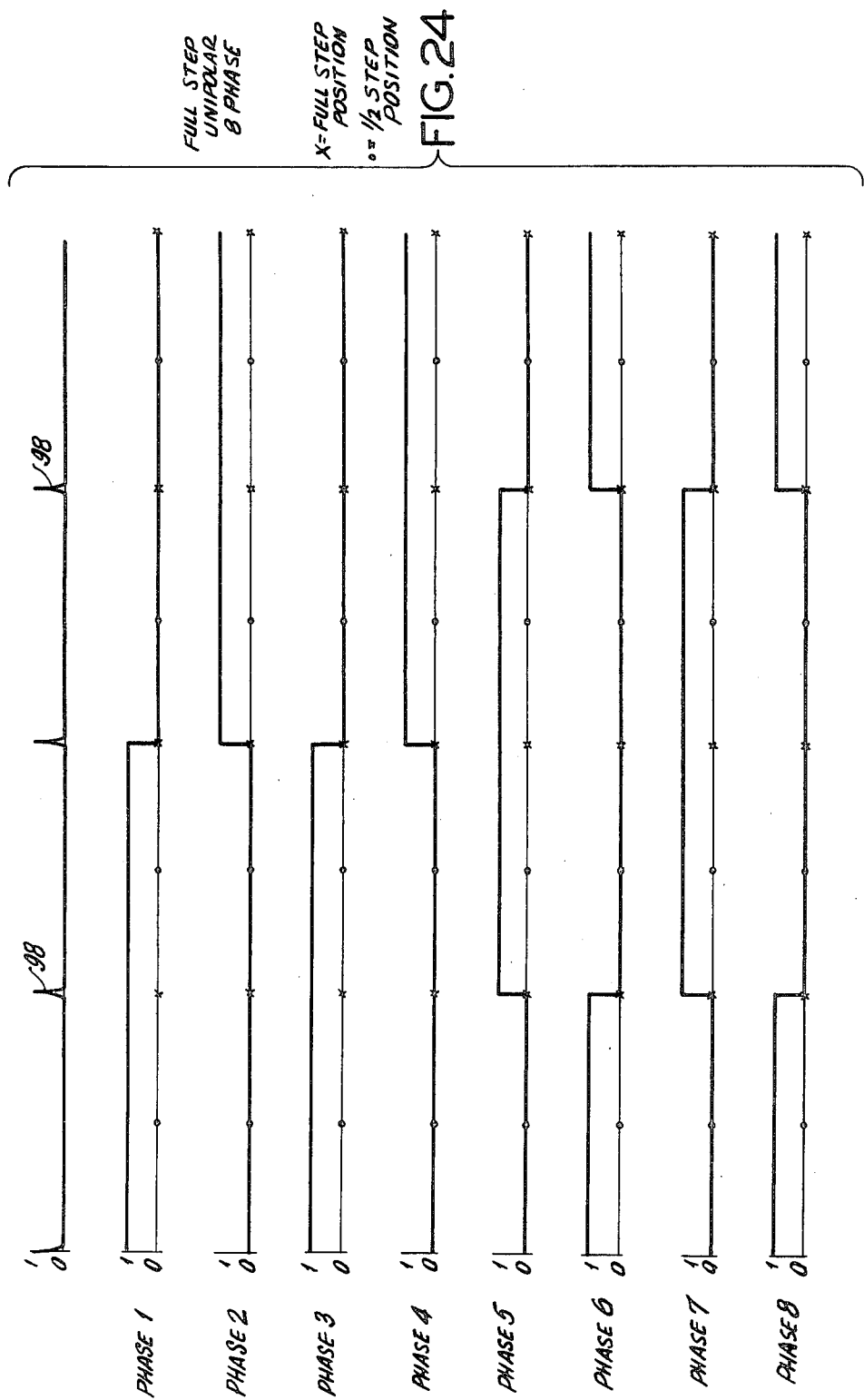

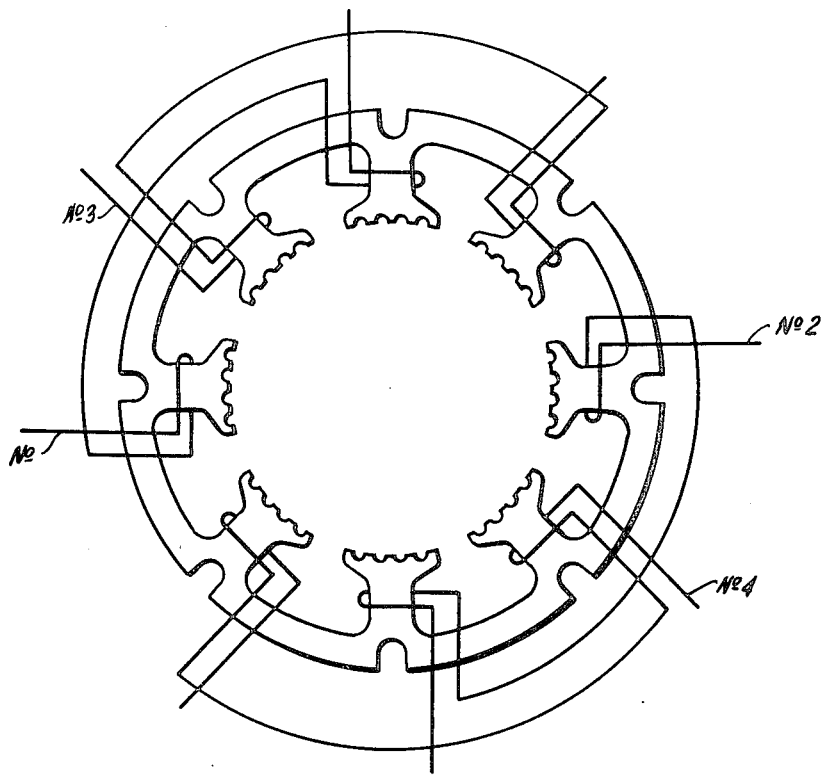
FIG.25  4 PHASE BIPOLAR
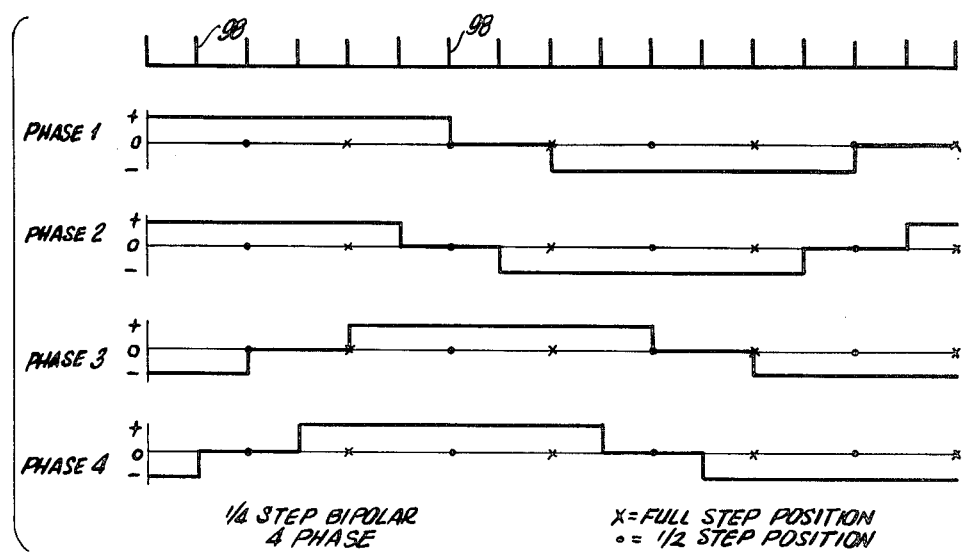
1/4 STEP BIPOLAR 4 PHASE
X = FULL STEP POSITION
○ = 1/2 STEP POSITION
FIG.26

SYNCHRONOUS MOTOR SYSTEM

This is a continuation of application Ser. No. 072,323 filed Sept. 4, 1979, now abandoned, which is a continuation of application Ser. No. 742,690 filed Nov. 17, 1976, now U.S. Pat. No. 4,255,696, which in turn is a continuation-in-part of application Ser. No. 654,400 filed Feb. 2, 1976, now abandoned.

BACKGROUND OF THE INVENTION

This invention relates to synchronous motor systems and particularly to stepping motor systems.

Stepping motors and their operation are well known. In an article entitled "New Inductor Motor Has Low Speed, Self-Start and High Torque" by J. H. Staak in the June 1947 edition of Electrical Manufacturing, Vol. 29, No. 6, published by the Gage Publishing Co., the author describes an early stepping motor. In such a motor, a rotor composed of two axially displaced sets of permanently-magnetized radially-extending rotor teeth rotates about an axis common to a stator composed of inwardly extending stator poles each having stator teeth. One set of rotor teeth is peripherally displaced relative to the other set by ½ tooth pitch. The stator teeth extend axially across both sets of rotor teeth.

One of the advantages of a stepping motor is its ability to rotate in synchronism with an applied voltage. Another advantage is its ability to "step" or rotate the rotor through a predetermined stepping angle in response to an input voltage or current pulse. This is of special importance where the motor operates in response to digital data. In general, the stepping angle, or the angle of a step, through which a rotor responds to a single pulse is determined by the number of rotor teeth, i.e., the rotor tooth pitch, and by the number of pulse. Another advantage of a stepping motor is that it is possible to provide for cogging during rotation or for smooth rotation depending upon the desired application, by selecting a proper stator tooth pitch relative to the rotor tooth pitch.

Stepping motors have a number of disadvantages. The stepping angle is a function of the number of rotor teeth. Thus, the smaller the desired stepping angle the greater the number of teeth required. Thus, motors requiring very fine resolution require rotors with small teeth. However, the machinery for manufacturing different types of rotors to satisfy different resolutions is expensive.

Moreover, the pulse generators which are used to drive large motors require power transistors with lrge current carrying capacities. The current carrying capacities of the transistors used limit the power which can be delivered to the motors. It is difficult to operate transistors in parallel to achieve high power drives, because variations in transistor characteristics may cause the transistors to carry currents unequally and eventually burn out the transistor carrying the highest current.

Furthermore, stepping motors tend to exhibit resonances. It is not known why such resonance exist. It has been supported that such resonances occur as a result of the starting and stopping shocks during each step. Stepping motors also tend to vibrate.

As a further point, the stepping motor stepping angles, because they are a function of the number of rotor teeth, are usually invariable once the motor has been built.

An object of this invention is to improve stepping motors.

Another object of this invention is to alleviate the aforementioned problems.

SUMMARY OF THE INVENTION

According to a feature of the invention, these objects are obtained, is whole or is part by having a motor drive magnetize the poles of the motor is specific direction, de-energize alternate ones of the poles, re-energize alternate ones of the poles in the opposite direction, de-energize the poles intermediate the alternate poles, and then re-energize the intermediate poles in the opposite direction, and then repeat the de-energization and reversals.

According to another feature of the invention the deenergization of the alternate poles is accomplished by successively deenergizing alternate poles and maintaining the deenergization until all the alternate poles have been de-energized, re-energizing the alternate poles in succession and maintaining them re-energized until all have been re-energized. Similarly, the intermediate poles are de-energized in succession and maintained in the de-energized state until it intermediate poles have been de-energized. The intermediate poles are re-energized in succession and maintained in the re-energized condition until all of the intermediate poles have been re-energized.

According to yet another feature of the invention, separately controlled semiconductor switches, such as transistors, is series with each winding, pass energizing current to at least two of the windings simultaneously.

According to another feature of the invention, during de-energization, one group of alternate poles is de-energized and maintained de-energized and then another group of alternate poles is de-energized. Then one of the groups of alternate poles is re-energized and maintained re-energized and then the other one of the groups is re-energized. Similarly, one group of intermediate poles is de-energized and maintained de-energized and then another group of intermediate pulse is de-energized. During re-energization one of the groups of intermediate poles is re-energized and maintained re-energized and then the other group of intermediate poles is re-energized.

According to still another feature of the invention each stator pole carries two winding portions and a separate semiconductor switch passes current to each portion.

These and other features of the invention are pointed out with particularly in the claims, which point out the invention. The aforementioned features only constitute a summary of the invention. Other objects and advantages of the invention will become evident from the following detailed description when read in light of the accompanying drawings.

BRIEF DESCRIPTION OF THE DRAWINGS

In The Drawings:

FIG. 8 is a truth table for the system in FIG'S. 6 and 7.

FIG. 13a is a group of graphs illustrating current and voltage conditions is the motor of FIG. 11 when operated according to one embodiment of the invention.

FIG. 22 illustrates a group of graphs showing conditions produced in the motor of FIG. 21 by the driver according to still another embodiment of the invention.

FIGS. 23 and 24 are groups of graphs illustrating conditions within the motor of FIG. 20 produced by the driver in accordance with another embodiment of the invention.

FIG. 25 is a schematic diagram of a stator of a motor according to another embodiment of the invention.

FIGS. 26, 27 and 28 are respective groups of graphs illustrating conditions within the motor of FIG. 25 according to other embodiments of the invention.

DESCRIPTION OF PREFERRED EMBODIMENT

Figure 1:
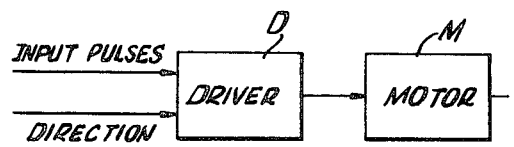
FIG. 1 is a block diagram of a system which embodies features of the invention and whose details appear in other figures.

In FIG. 1 a driver D receives control pulses from an external source (not shown) and drives a motor M. The driver also receives an external rotation direction signal which instructs the driver D to rotate the motor is one or the other direction.

Figure 2:
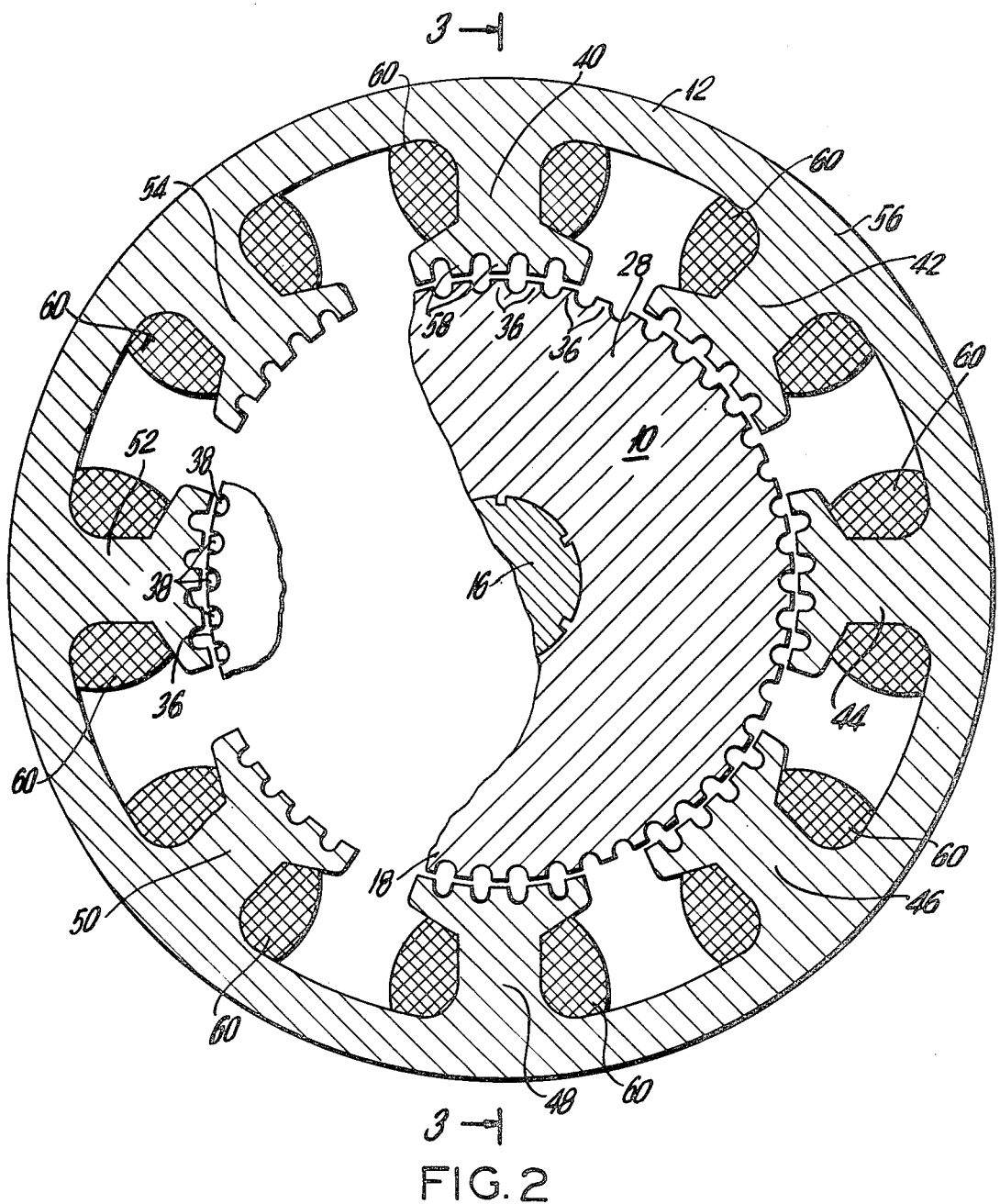
FIG. 2 is a section of the motor in FIG. 1 and specifically a section 2—2 of the motor in FIG. 3.
Figure 3:
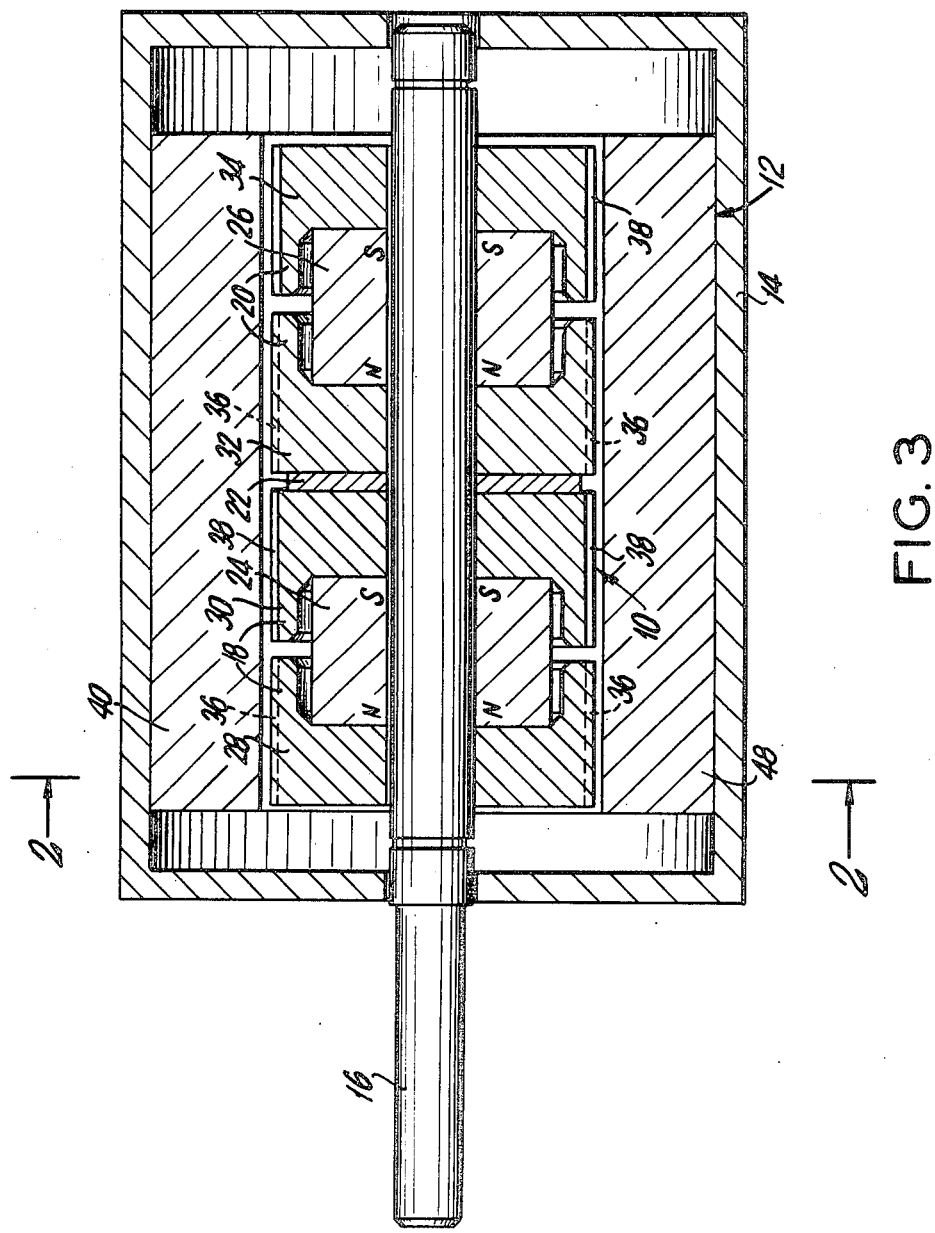
FIG. 3 is a section 3—3 of the motor in FIG. 2.

The motor M appears in more detail in FIGS. 2 and 3. In FIG. 3, the rotor 10 rotates within a stator 12 mounted within a housing schematically shown as 14. Other than the windings the motor shown is conventional. A shaft 16 projects through the housing and is keyed to the rotor 10 for rotation therewith. Suitable bearings not shown mount the rotor 10 and the shaft 16 rotatable within the housing 14.

As specifically shown in FIG. 3 the rotor 10 is composed of two identical, axially displaced, rotor sections 18 and 20. A non-magnetic spacer 22 separates the sections 18 and 20 from each other. Forming sections 18 and 20 are respective permanent magnets 24 and 26 axially magnetized in the directions shown. Four cap-shaped rotor pole shoes 28, 30 and 32, 34 encapsulating the respective magnets 24 and 26 at their axial ends form front and rear rotor segments in each rotor section with their permanent magnets. The pole shoes 18, 30, 32 and 34, for simplicity, will also be referred to as rotor segments. As more particularly shown in FIG. 2, the rotor segment 28 carries fifty peripherally spaced teeth 36 projecting radially outward. Of course the number of teeth shown is only an example. Other embodiments of the invention utilize pole shoes with other numbers of teeth such as 40 or 48. In the example shown, the angular or peripheral tooth pitch, that is, the angular distance between like points on adjacent rotor teeth 36 is 7.2 degrees. As is readily ascertainable from FIG. 3, the entire segment 28 is magnetized by the permanent magnet 24 to exhibit a north polar magnetization. Although not shown, the teeth 36 are spaced about the entire periphery of the rotor segment 28. The teeth extend longitudinally along the axial direction of the rotor.

The rotor segment 30 is identical to the segment 28 and carries outwardly directed peripherally spaced radial teeth 38. However, the segment 30 is mounted on or keyed to the shaft 16 so that the rotor teeth are angularly offset by one-half tooth pitch and so they appear, looking axially, midway between the teeth 36. This is shown most precisely in the left hand portion of the rotor in FIG. 2. For simplicity, the rotor teeth 38 sticking out between and behind the rotor teeth 36 are not illustrated in the remainder of the rotor. However, it should be understood that rotor teeth do in fact exist in these locations behind the rotor segment 28. For simplicity, the teeth in the segments 32 and 34 of the section 20 are identified with the same reference numerals as the teeth in the segments 28 and 30 of the section 18. The sections 18 and 20 are identical, and their teeth aligned.

As shown in FIG. 2, eight angularly displaced poles 40, 42, 44, 46, 48, 50, 52, and 54, project inwardly from a common circumscribing stator portion 56 to form the stator 12. The poles extend longitudinally along the entire axial dimension of the stator 12 beyond the rotor 10. Five stator pole teeth or stator teeth 58 form the inner radial ends of each pole 40 to 54. The pole teeth are formed along an imaginary cylindrical surface coaxial with the rotor and spaced slightly from the rotor teeth 36 and 38. In the embodiment shown, the pole teeth are pitched at 7.2 degrees. Thus they have the same pitch as the rotor teeth 36 and 38. According to other embodiments the rotor teeth have different pitches. In this embodiment the rotor tooth pitch and the stator tooth pitch are the same. In others they are different. The poles 40 to 54 and their respective teeth 58 are angularly arranged so that the teeth on two opposite poles such as 40 and 48 can directly oppose the rotor teeth 36 on one pole shoe when teeth on poles 44 and 52 ninety degrees therefrom are completely out of alignment with the teeth 36 on the same pole shoe. The teeth 36 on the remaining forty-five degree angularly oriented poles 42, 46, 50 and 54 are angularly arranged so that they are ninety degrees and 270 degrees out of phase with the angular alignment of the rotor teeth 36 of the same pole shoe, in the same position.

The pole teeth 58 extend longitudinally parallel to the rotor axis from one end of the rotor 10 to the other. Thus when the teeth 58 on the pole 52 and 44 are 180 degrees out of alignment with the teeth 36 of the segment 28, they are completely aligned with the teeth 38 on the segment 30. At the same time the teeth 58 on the poles 40 and 48 are completely out of alignment with the teeth 38.

Stator coils 60 magnetize the poles 40 to 54 in a sequence that causes rotation of the rotor. Details of the stator coils 60 and their arrangement on the stator appear schematically in FIG. 4. Here the eight coils are formed of eight respective windings 82, 84, 86, 88, 90, 92, 94, and 96 each representing one of eight phases P1 to P8.

In a conventional motor the poles are energized to produce a magnetic North (N) and South (S) pole sequence of N—N—S—S—N—N—S—S from one pole to the peripherally adjacent pole. A driver then responds to a pulse to change the magnetization sequence of the same poles to S—N—N—S—S—N—N—S, and to the next pulses to change the sequences to S—S—N—N—S—S—N—N, and N—S—S—N—N—S—S—N . . . etc. As a result the rotor turns ¼ rotor tooth pitch, i.e., one-quarter of the angular distance between corresponding portions of adjacent rotor teeth, in response to each pulse. Hence each pulse moves the resultant magnetic vector 45° but moves the rotor only ¼ rotor tooth pitch. This quarter rotor tooth pitch is referred to as one rotor step in an eight pole motor.

Figure 4:
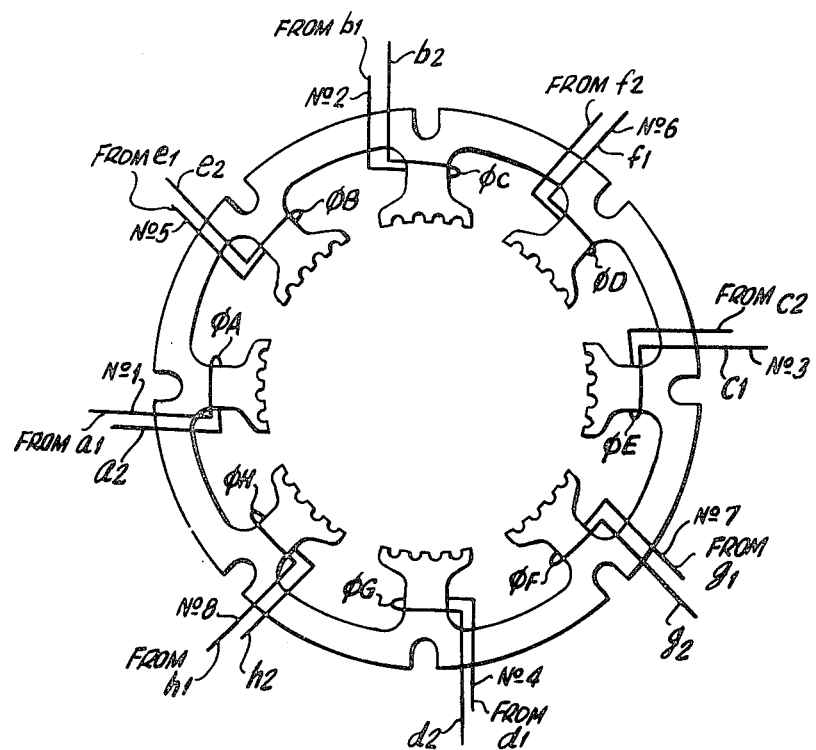
FIG. 4 is a scematic illustration of a stator and stator windings in a motor embodying features of the invention.
Figure 5:
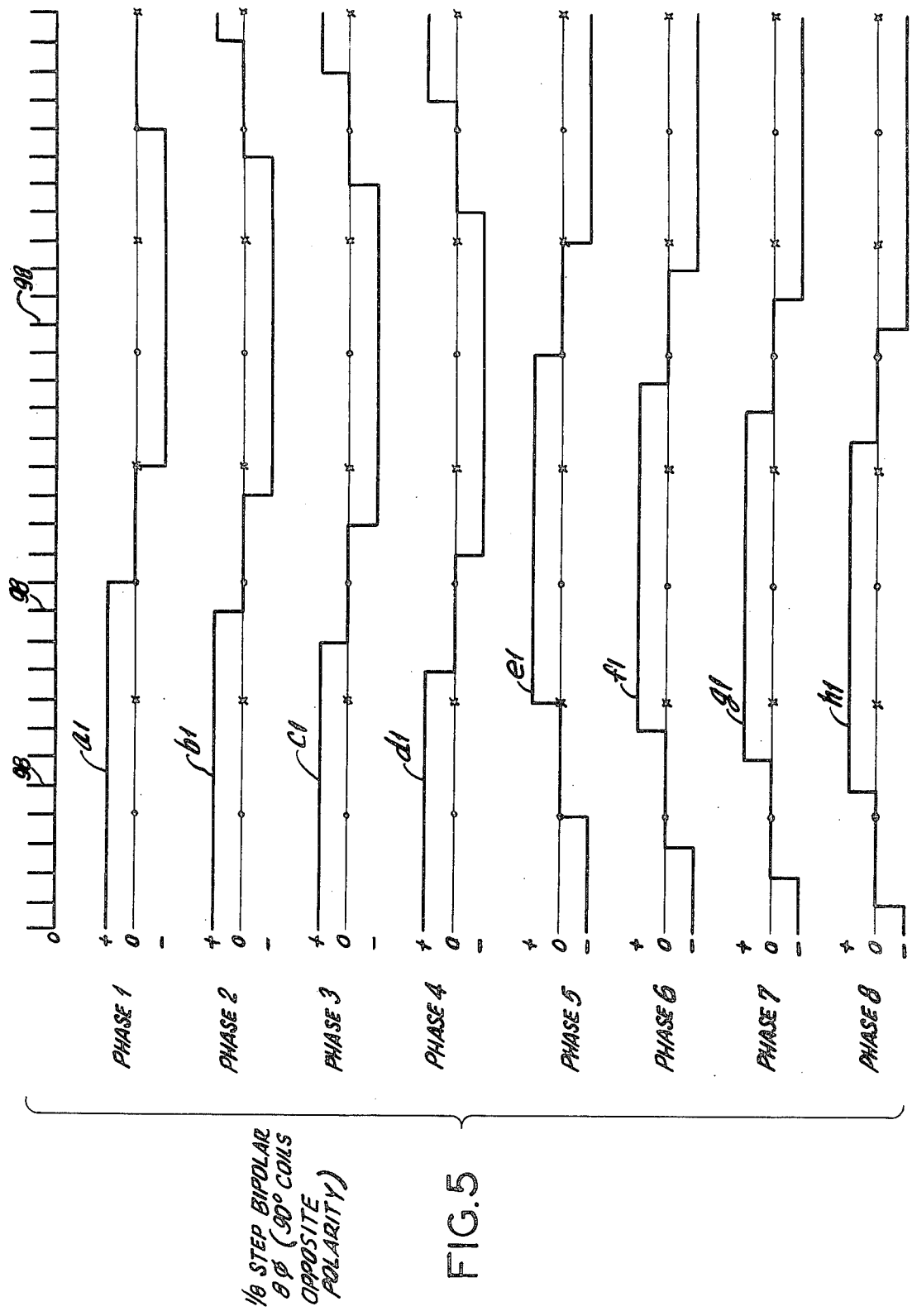
FIG. 5 are a plurality of graphs illustrating the currents applied through the windings of the motor in FIG. 2.

In the motor disclosed in FIG. 4 and embodying the invention, driver D responds to successive pulses 98 of FIG. 5 and generates the voltages 100 to 108 and applies them to the windings 82 to 96. This moves the rotor 10 ⅛th step or 1/32 rotor tooth pitch for each pulse 98.

Figure 6:
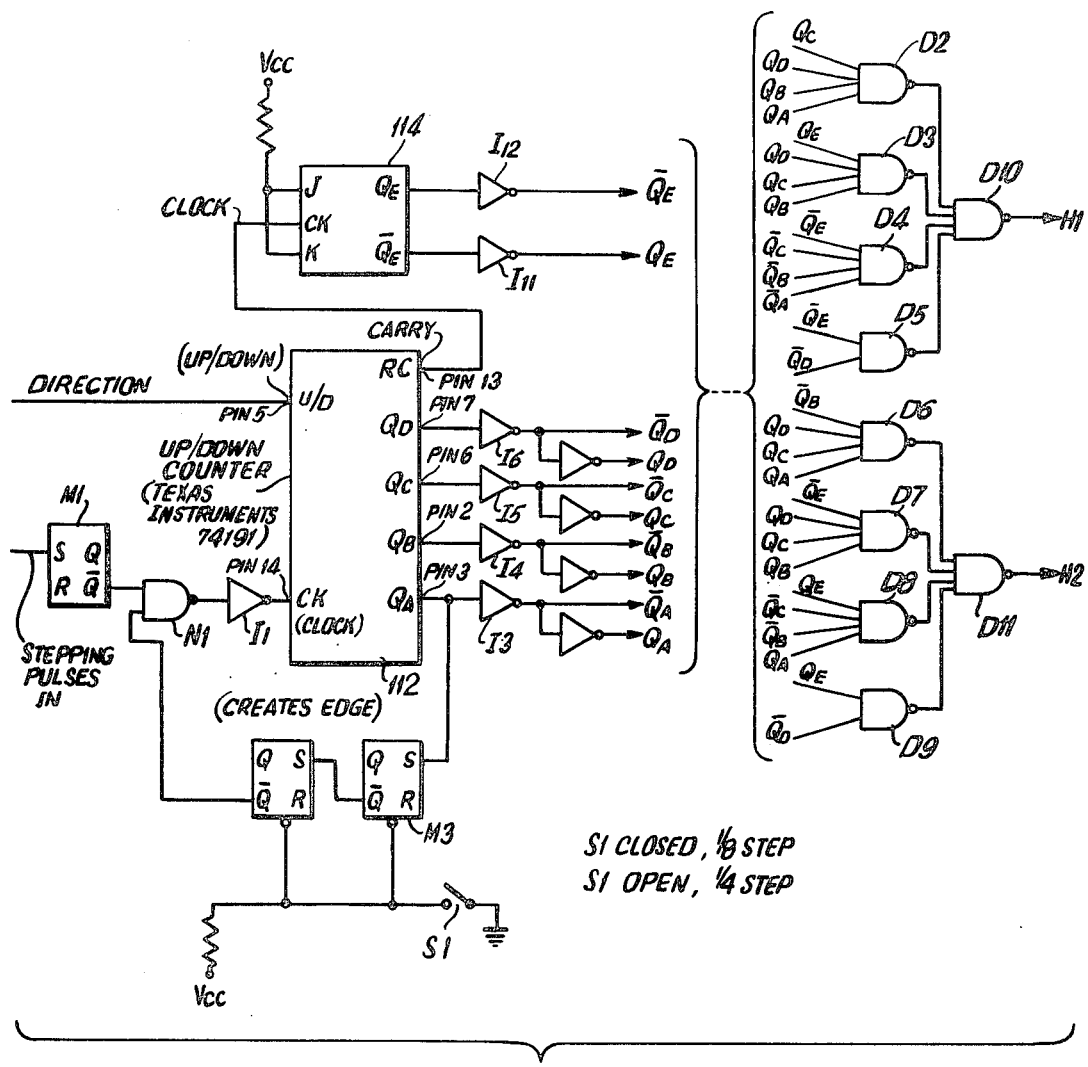
FIG. 6 is a scematic diagram illustrating details of the driver in FIG. 2.
Figure 7:
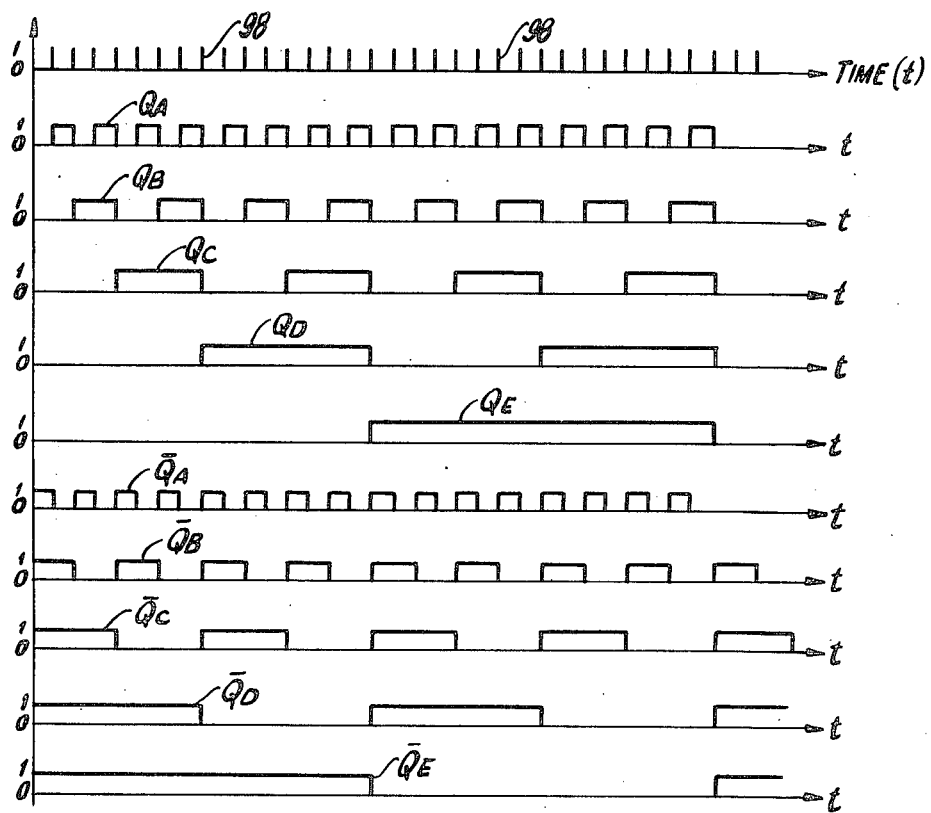
FIG. 7 is a group of graphs illustrating voltages appear at points in FIG. 6.

Details of the driver D appear schematically in FIGS. 6, 7 and 8. In FIG. 6, pulses 98 from an external source are applied to a monostable multivibrator M1. The latter produces inverse pulses. Whenever a zero or low appears, a NAND gate N1 applies the signal through a second inverter I2 to a dividing circuit 112. The latter is in the form of an up-down counter. In the dividing circuit 112, an output $Q_A$ produces a pulse in response to every second pulse applied at the input $C_R$. An output $Q_B$ produces a pulse for every four pulses at the input. An output $Q_C$ produces a pulse for every four pulses at the input An output $Q_D$ produces a pulse for every 16 pulses. The divider 112 is composed of an integrated circuit chip. A fifth output of the divider 112 applies every 16th pulse to a reset terminal of a JK flip-flop 114 which again divides the input pulses so that at the terminal $Q_E$ there exits an output for every 32 input pulses. The flip-flop 114 and the divider 112 could have been a single unit. However, the divider 112 which divides by 2, 4, 8 and 16, is more conveniently available as a semiconductor chip. The flip-flop 114 was added to provide the extra division function. A second output $\overline{Q}_E$ produces the inverse of the output $Q_E$.

Inverters I3 through I6 invert the outputs at $Q_A$ through $Q_D$ to produce outputs $\overline{Q}_A$, $\overline{Q}_B$, $\overline{Q}_C$, and $\overline{Q}_D$. Inverters I7, I8, I9 and I10 again invert the already inverted Q outputs to recreate the outputs $Q_A$, $Q_B$, $Q_C$ and $Q_D$. The purpose of inverting the Q outputs of the divider 112 is to isolate the circuitry of the divider 112 from the following circuitry. Similarly, inverters I11 and I12 forming the outputs $Q_E$ and $\overline{Q}_E$ isolate the outputs of the flip-flop 114 from subsequent circuitry. The input voltage 98 and the outputs $Q_A$ through $Q_E$ and $\overline{Q}_A$ through $\overline{Q}_E$ appear in FIG. 7. The conditions of $Q_A$ through $Q_E$ also appear in the truth table shown in FIG. 8 in five columns at the left of the table. The first column headed "State" constitutes a count of the pulses 98.

In FIG. 6, the voltages $Q_A$ through $Q_E$ are connected to the inputs of eight NAND gates D2 through D9. The actual connections are not shown in order to avoid confusion which the large number of lines would produce. However, in the NAND gate D2 the four inputs are connected to the output $Q_E$ of inverter I 11, the output $Q_D$ of the inverter I10, the output $Q_C$ of the inverter I9, and the output $Q_D$ of the inverter I8. That is, each input of the NAND gate D2 is connected to the output of the inverter I3 through I12 having the corresponding designation. Similarly, the inputs of NAND gates D3 through D9 are provided with specific designations and are connected to the outputs of the inverters I3 through I12 having the corresponding designations. The NAND gates D2 through D9 each produce a zero or low in response to the voltage at all of the inputs being 1 or high. When a zero appears at the output of any of the NAND gates D2 through D5 a 1 appears at the output of a NAND gate D10. Similarly, a zero appearing at the output of any one of the NAND gates D6 through D9 produces a 1 at the output of a NAND gate D11.

Figure 9:
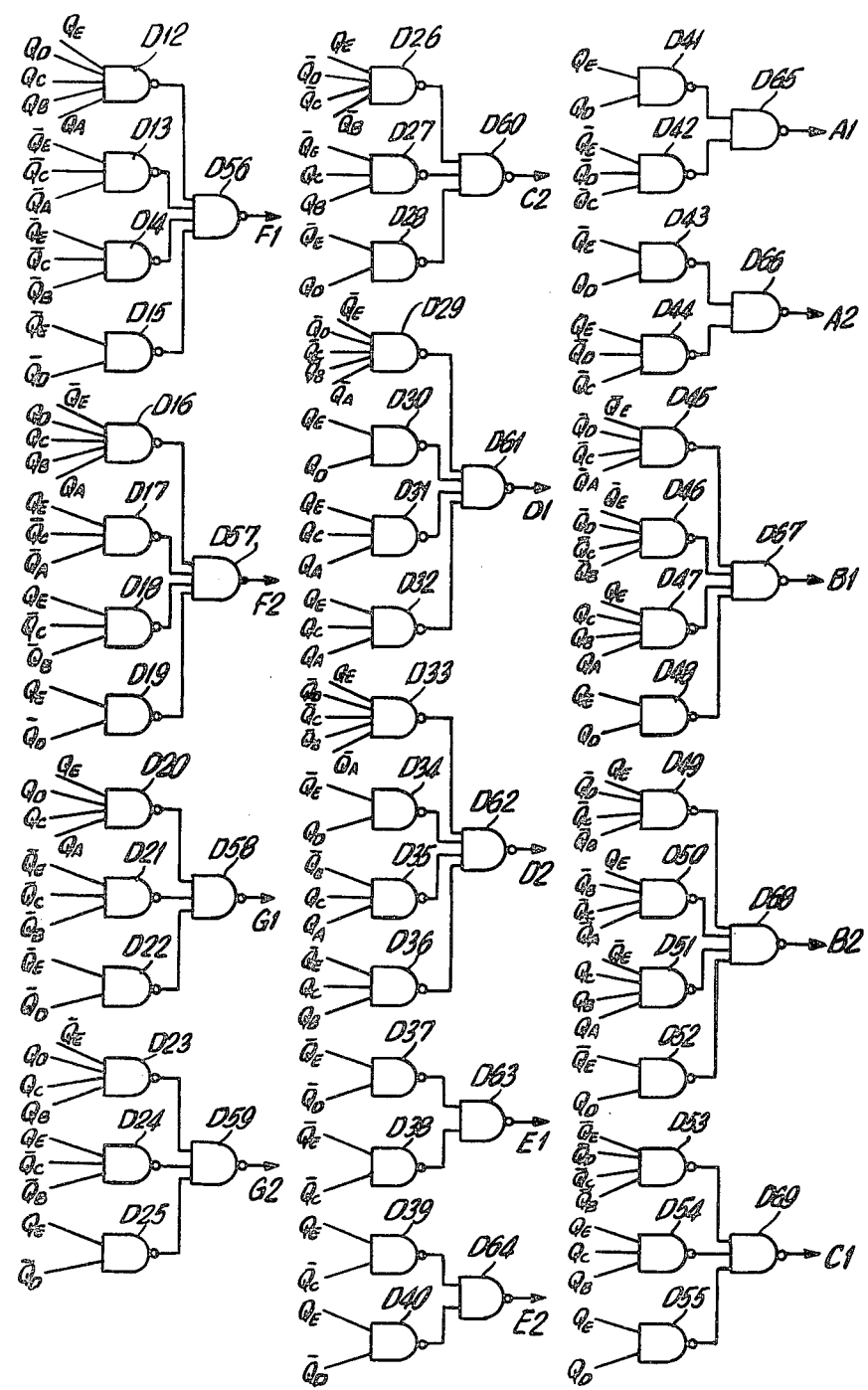
FIG. 9 is a scematic logic diagram illustrating further details of the driver in FIG. 1.

FIG. 9 also forms part of the driver D. Here NAND gate D12 through D55 are also connected as indicated to the outputs of inverters I3 through I12. Each input to the NAND gates D12 through D55 is marked with a Q and a subscript or a Q with a subscript and is connected to the output of the inverters I3 through I12 carrying the corresponding designation. Each of the NAND gate D12 through D55 produces a zero output in response to all of its inputs being 1 in a manner similar to that discussed with respect to NAND gates D2 through D9.

NAND gates D56 through D69 connect to the outputs of the NAND gates D12 through D55 as shown and each produces a 1 in response to any of its inputs carrying a zero. This corresponds to the operation of the NAND gates D10 and D11. The outputs of the NAND gates D10, D11, and D56 through D69 are designated A1, A2, through H1, H2. FIG. 8 is a truth table of the outputs appearing at A1,A2, through H1,H2 for the various conditions which occur through the first 32 pulses 98 and the various conditions of $Q_A$ through $Q_E$.

Figure 10:
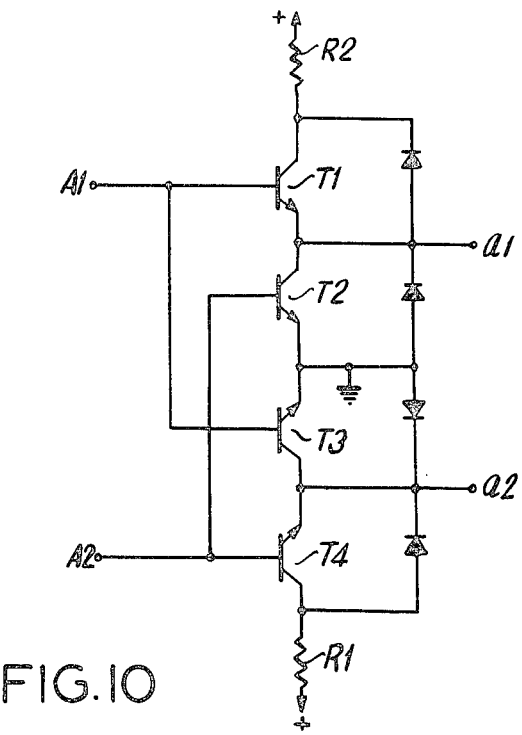
FIG. 10 is a schematic diagram of further details of the drivers in FIG. 1.

A power circuit shown in FIG. 10 connects the outputs A1 and A2 to the ends a1 and a2 of the winding 82. Here, four transistors have their emitter collector paths connected in series with each other and with two resistors R1 and R2. When the voltage at a1 is positive the voltage at a2 is zero. Similarly, when the voltage at a2 is positive, the voltage at a is zero. However, a zero voltage can exist at both a1 and a2.

When the voltage at A1 is positive, transistors T1 and T3 conduct. This forms a current path from the positive source through the resistor R2, the transistor T1, the windings between the terminals a1 and a2, the transistor T3 at ground. When A2 is 1, transistors T2 and T4 conduct and form a current path from the positive supply through the resistor R1, the transistor T4, the winding between the terminals a2 and a1, the transistor T2 to ground. In this second case the current flow through the winding occurs from a2 to a1. This contrasts with the condition when A1 is 1 during which time current flows from a1 to a2.

Identical circuits to that in FIG. 10 appear across the respective pair of leads B1 and B2, C1 and C2 . . . H1 and H2. These are respectively connected to the pairs of winding ends b1 and b2, c1 and c2, . . . h1 and h2. The resulting currents in the windings of FIG. 4 are the ones shown in FIG. 5.

From FIG. 5 it can be seen that during the first step each of the windings is energized. This creates a summation of magnetic forces which produces an equilibrium position for the rotor relative to the stator teeth. During the second step, i.e., the second pulse 98, one of the windings is de-energized. This changes the equilibrium position and causes the rotor to move 1/32 of a rotor tooth pitch. During the next two steps, other windings are progressively de-energized. Then a previously de-energized winding h1 is re-energized in the opposite direction and another winding de-energized. This progression shifts the rotor 1/32 of a tooth pitch during each step.

Figure 11:
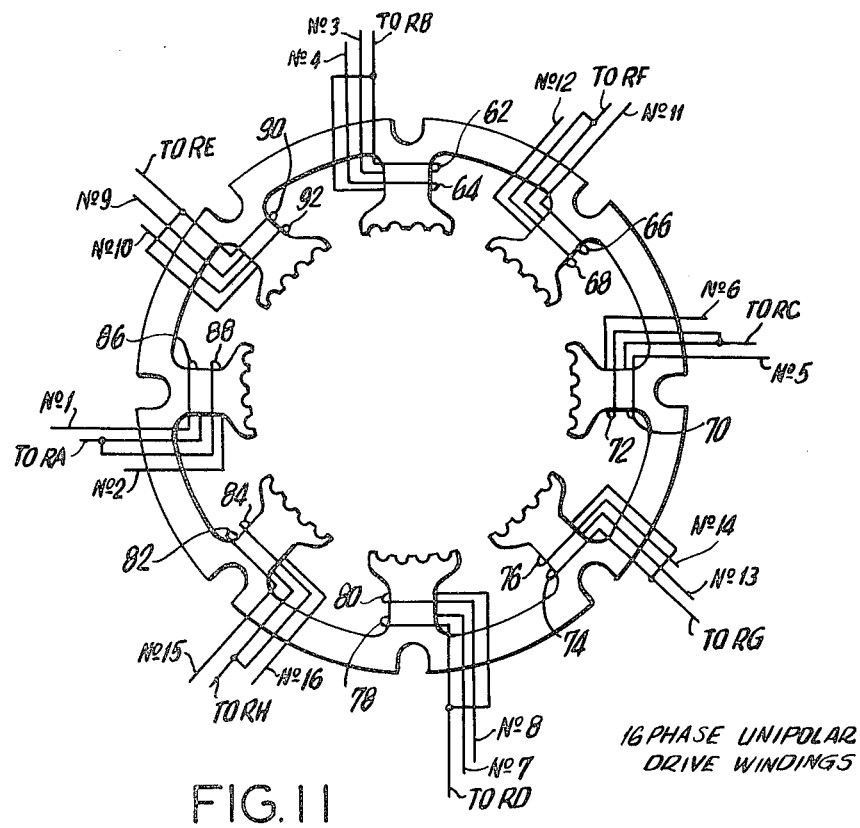
FIG. 11 is a schematic diagram of a winding arrangement of another motor embodying features of the invention.

FIG. 11 illustrates another embodiment of the invention. Here, the coils 60 are each composed of two windings identified as phases 1 to 16. Coupling the windings in FIG. 11 to the logic outputs of NAND gates D10, D11, and D56 through D69 is a power circuit 120 composed of eight sections PA through PH. In each section, two transistors T10 and T11 receive logic signals from the terminals indicated. When the transistor T10 of any section is turned on, current flows from the source B+ through a resistor RA-RH through the winding of the odd numbered phase such as phase 1, and through the transistor T10 to ground. Similarly when the transistor T11 of any of the sections PA to PH is turned on, current flows from the source B through the resistor RA-RH, through the even numbered phase winding to which it is connected, through the transistor T11 to ground. The diodes DI1 and DI2 form a current path for reverse currents generated by each winding when the winding is unenergized and the field of the winding collapses. Diodes DI3 and DI4 in FIG. 10 perform the same function.

Figure 13:
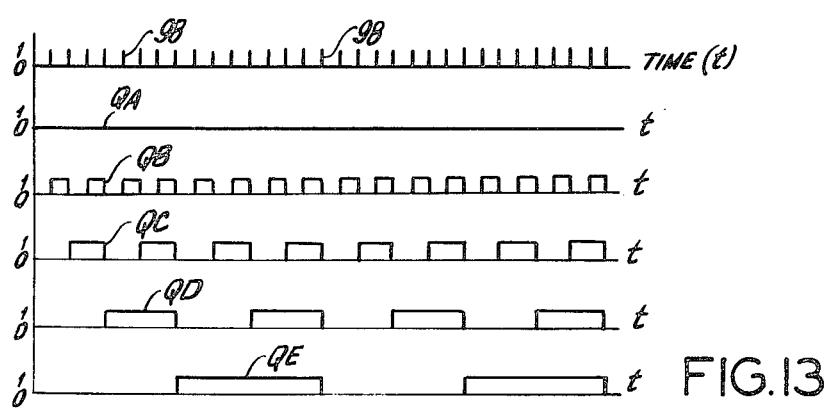
FIG. 13 illustrates a group of graphs illustrating operation of the circuit in FIG. 6 when the circuit is operated in an alternate mode.

FIG. 13A illustrates the voltages applied to the particular windings as a result of the pulses 98 applied to the input.

It can be seen, that each pole has at least one winding energized during the first step. For the next four steps, one pole after another is depolarized until the winding 15 reverses the polarity in that pole while still another pole is unpolarized. This process continues and effectively moves the rotor by 1/32 rotor tooth pitch in response to each pulse 98. The operation of FIG. 11 differs from that of FIG. 4 in that the reverse voltages and currents which appear in FIG. 5 and are applied to the winding, occur as forward voltages and currents. However, in FIG. 11, each pole has two windings. One of the windings on each pole receives only what would have been the forward voltages and currents in FIG. 5. The other winding on each pole of FIG. 11 receives only what would have been the reverse voltages and currents of FIG. 5, but receives them as positive voltages and currents. However, this other winding is energized in the reverse direction from the first winding of that pole. Thus a forward current through that winding magnetizes the poles in the opposite direction from the magnetization produced by the current in the first winding of that pole.

Figure 14:
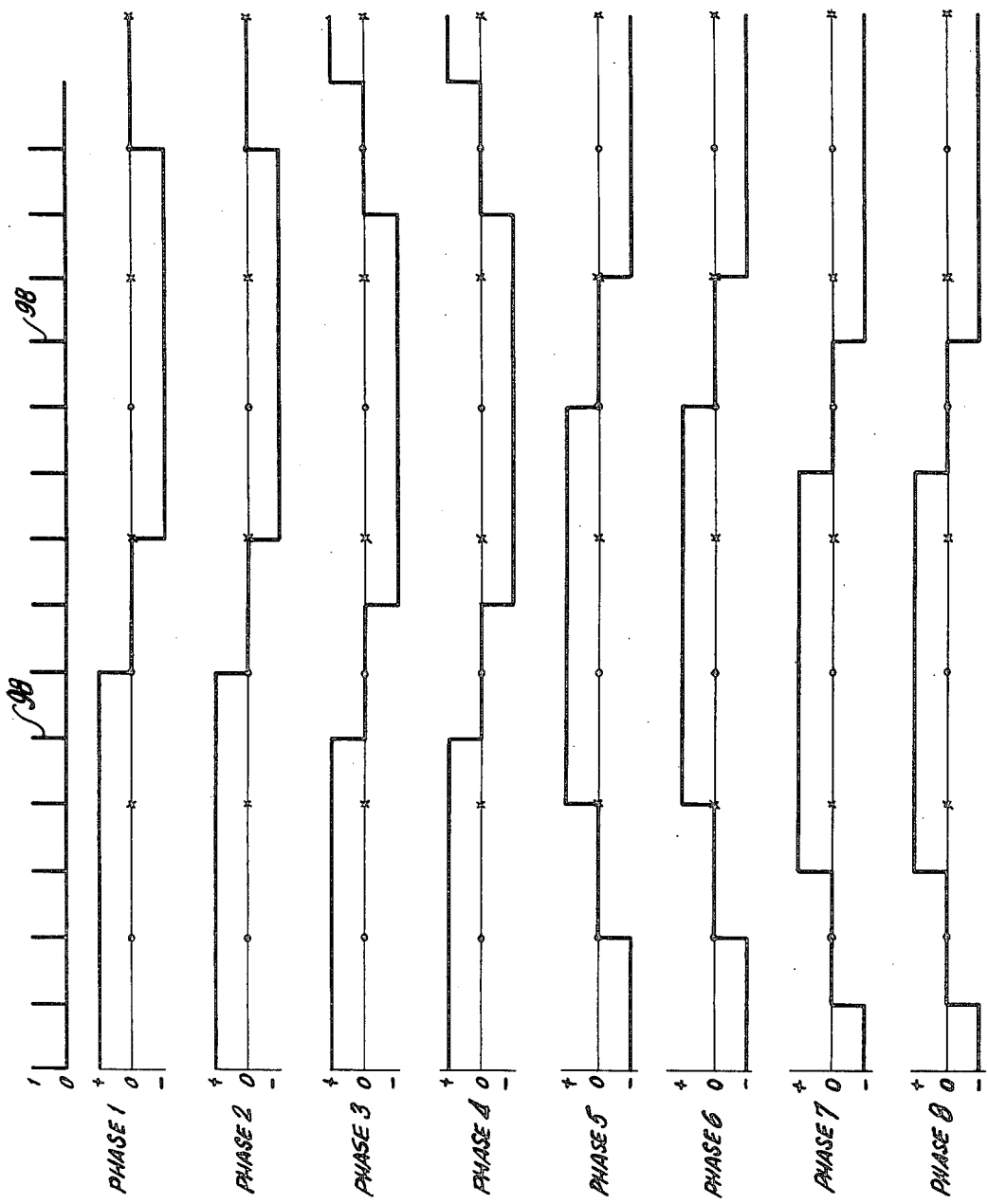
FIG. 14 are a group of graphs illustrating conditions within the motor of FIG. 6 when the driver operates according to one embodiment of the invention.

According to another embodiment of the invention the driver D illustrated in FIGS. 6 and 7 can also drive the motor of FIG. 4 to respond to the input voltage 98 and rotate the rotor 1/16 rotor tooth pitch for every pulse. This is accomplished by opening the switch S1 of FIG. 6. The switch S1 is normally closed for the 1/32 rotor tooth pitch rotation, which closing disables two monostable multivibrators M2 and M3. When the switch S1 is opened, the multivibrators respond to the leading edge of the output at $Q_A$ and produce a very narrow pulse which is reapplied by the NAND gate N1 and the inverter I2 to the clock input of the divider 112. This immediately shifts the divider to divide by 4 during the remainder of the first pulse. As a result, an output pulse is started at $Q_B$. The output at $Q_A$ is effectively smoothed by the inverters I3 and I7. The results at these outputs appear in FIG. 13. The voltage at $Q_A$ is substantially always at zero. The outputs $Q_B$, $Q_C$, $Q_D$ and $Q_E$ all correspond to what was formerly $Q_A$ through $Q_D$. The resulting voltages at NAND gates D10, D11, aND D56 through D69 produce outputs from the circuits of FIG. 10 as shown in FIG. 14. This moves the rotor ¼ step, i.e. 1/16 rotor tooth pitch. Two phases are energized identically.

Figure 15:
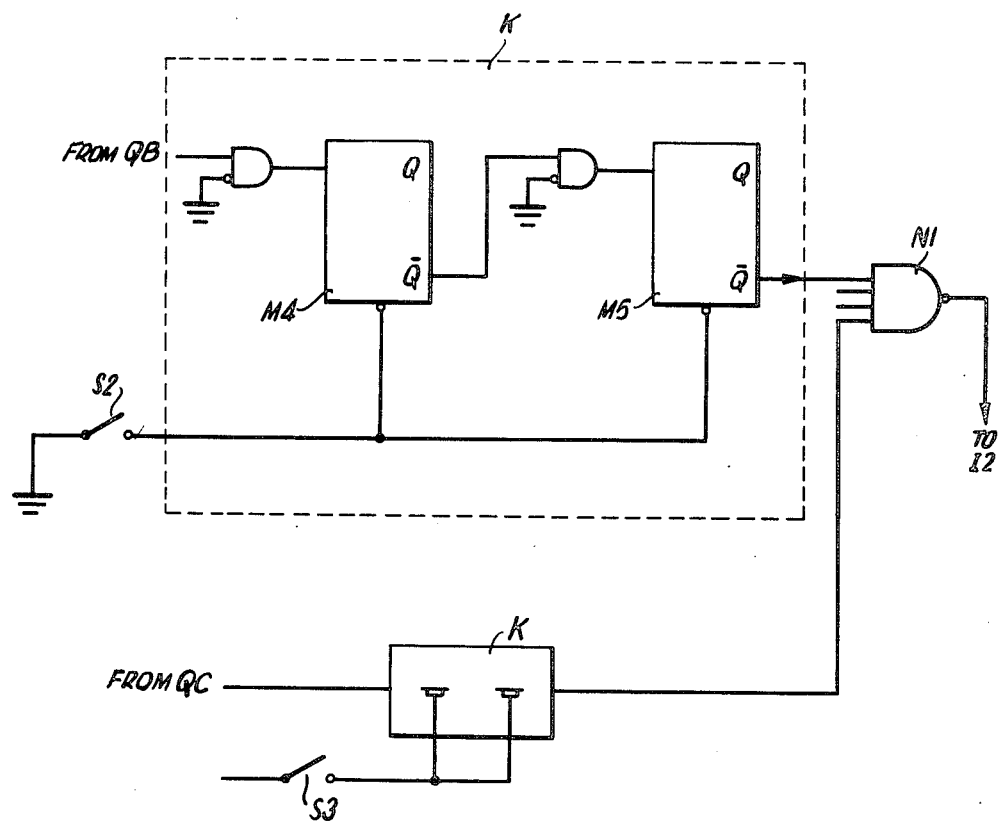
FIG. 15 is a schematic and partial diagram of further details of the driver in FIG. 1 for operating according to still another embodiment of the invention.
Figure 16:
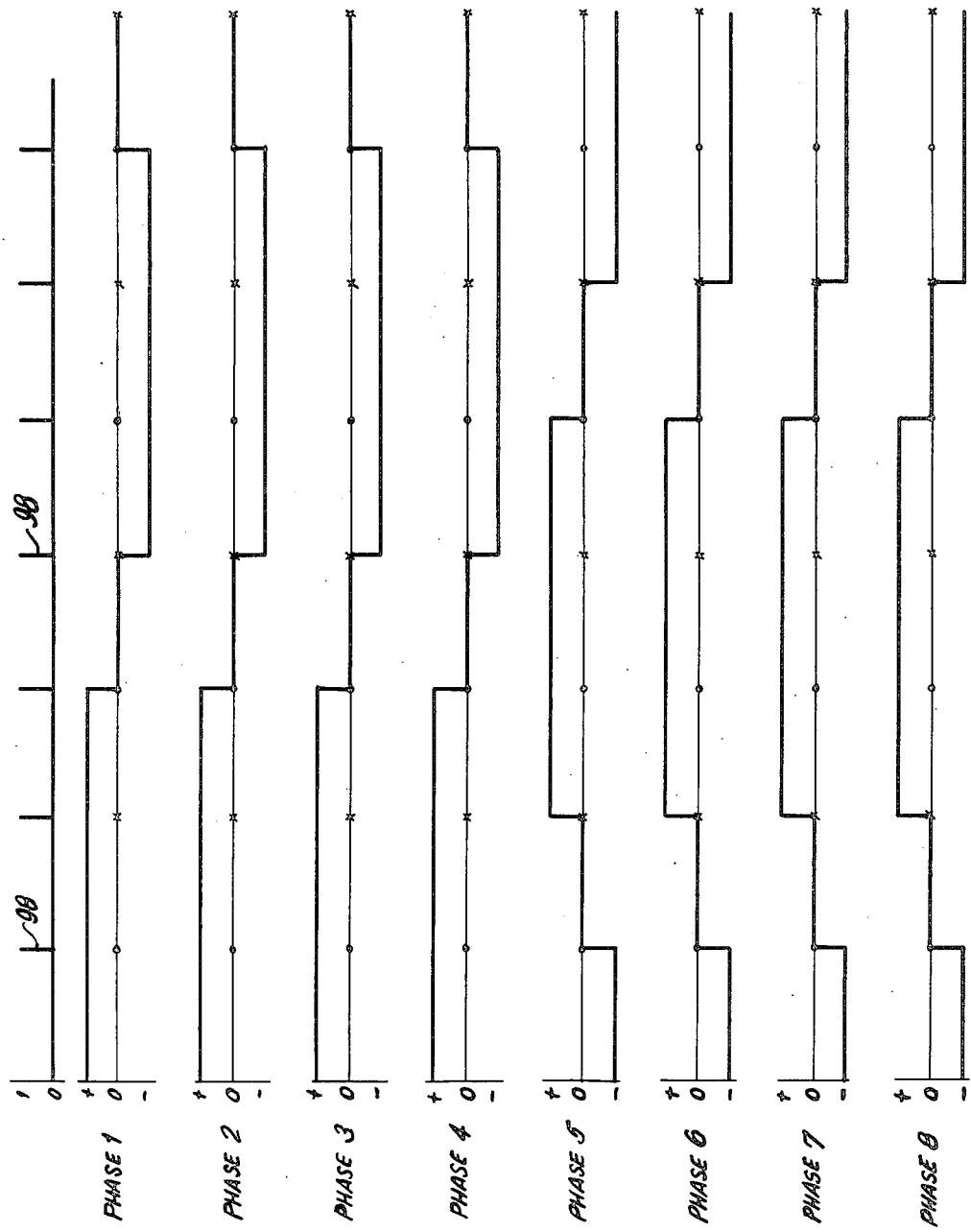
FIG. 16 shows a group of graphs illustrating energization of the motor in FIG. 4 according to yet another embodiment of the invention.
Figure 17:
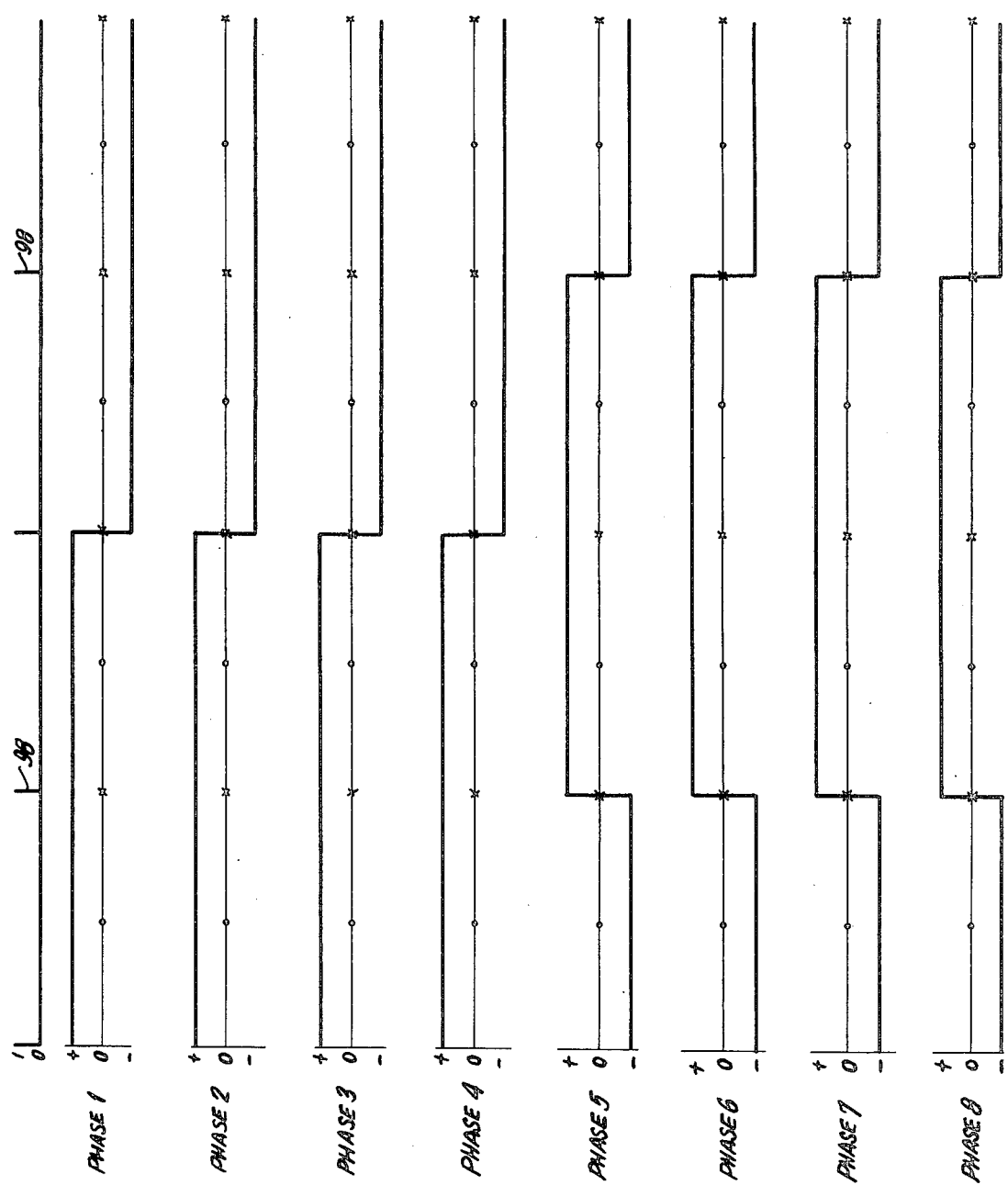
FIG. 17 illustrates a group of graphs showing conditions within the motor of FIG. 11 according to still another embodiment of the invention.

Half steps can be produced with the structures of FIGS. 4, 6 and 7 by coupling the output $Q_B$ to a third input of the NAND gate N1 through two more monostable multivibrators M4 and M5 as shown in FIG. 15. These multivibrators from a circuit K. A switch S2 when closed inhibits operation of the circuit K and causes the system to operate at a ¼ step. A full step can be achieved by adding a second circuit K connected to the terminal $Q_C$ and another input of the NAND gate N1. Half-step and full-step bipolar energization of the windings are shown in FIGS. 16 and 17.

Figure 18:
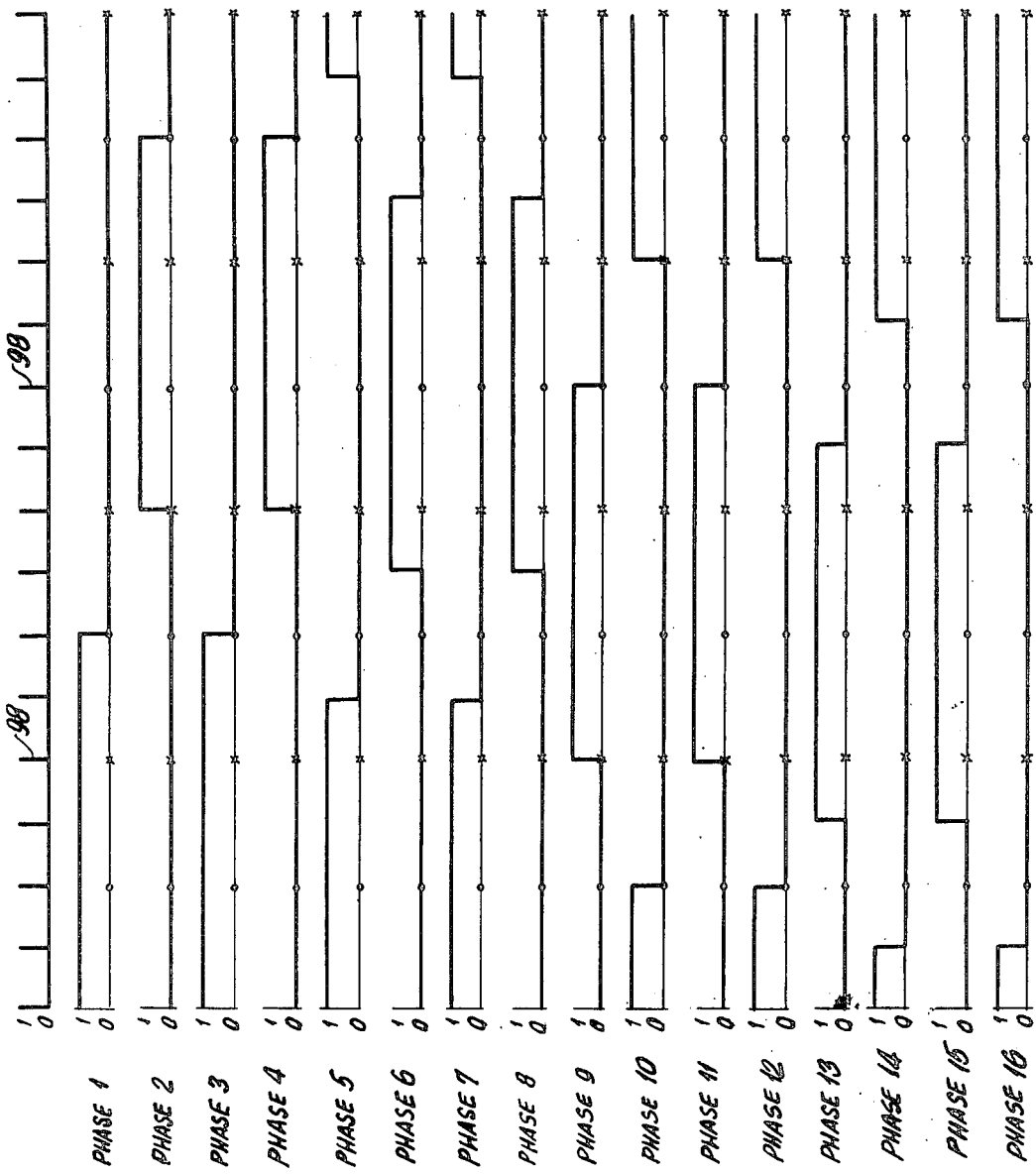
FIG. 18 illustrates a group of graphs showing the operation of the motor of FIG. 11 according to still another embodiment of the invention.
Figure 19:
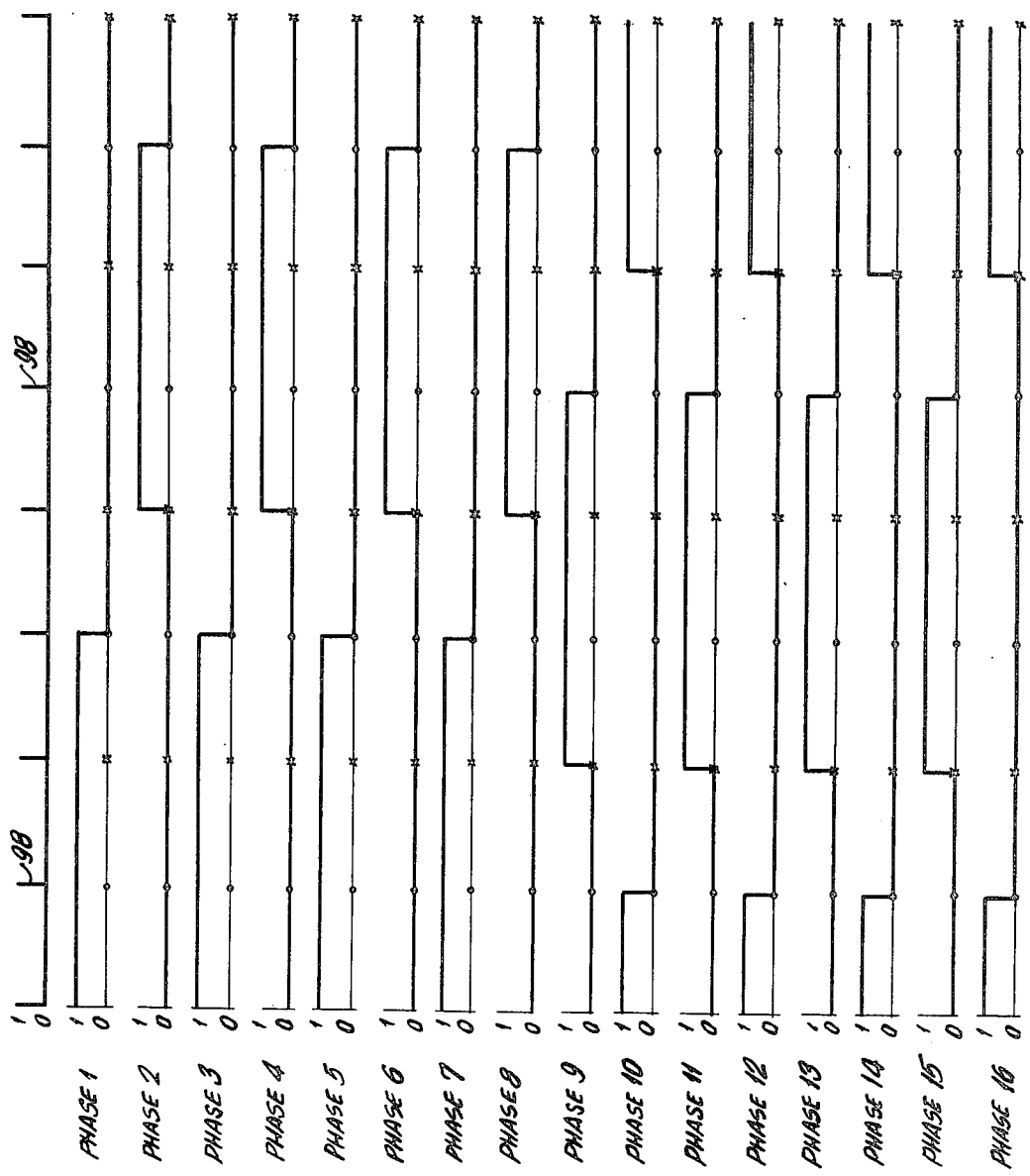
FIG. 19 is a group of graphs showing conditions of the motor in FIG. 11 according to still another embodiment of the invention.
Figure 20:
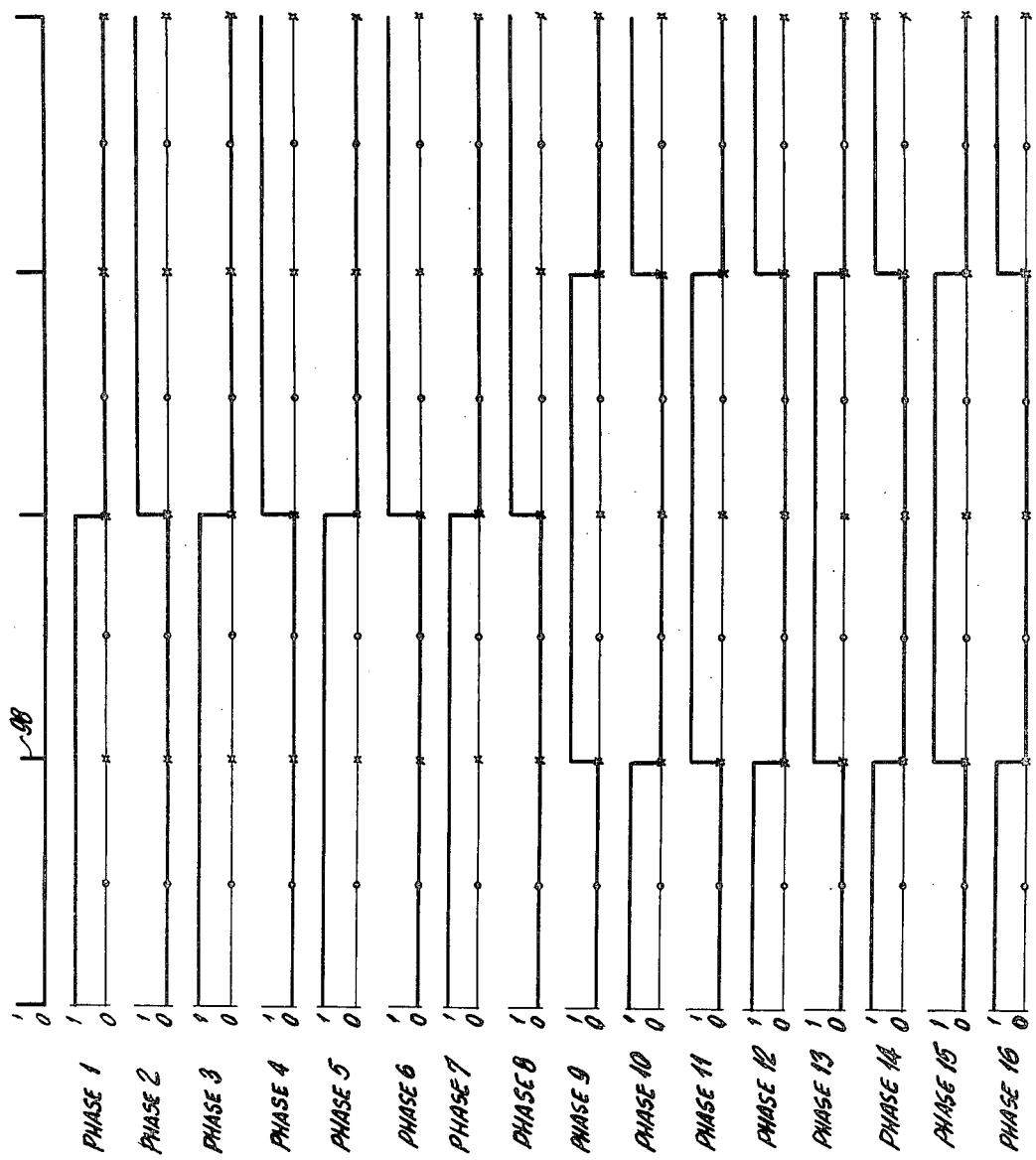
FIG. 20 illustrates a group of graphs showing conditions within the motor of FIG. 11 according to still another embodiment of the invention.

According to another embodiment of the invention, the 16 phase unipolar windings of FIG. 11 are combined with the circuits of FIGS. 6 and 7 to produce quarter step energization as shown in FIG. 18. This is accomplished by closing the switch S1 and using the circuit of FIG. 12 to couple the outputs of FIGS. 6 and 7 with the inputs of FIG. 11. In this arrangement, half-step unipolar operation is obtained by adding the circuit of FIG. 15 while opening switch S2 while closing switch S3. This produces the energization shown in FIG. 19. The energization shown in FIG. 20 results from closing the switch S3 of FIG. 15 when it is connected in FIG. 6 as discussed.

In all of these embodiments, it is possible to reverse the rotation of the motor by applying a step voltage to a terminal DIR through an inverter I 100 to the U/D terminal (the up-down terminal) of the divider 112. The divider 112 is structured for this purpose and is available from Texas Instruments Corporation as Up-Down Divider 74191 in the form of a semiconductor chip.

Figure 12:
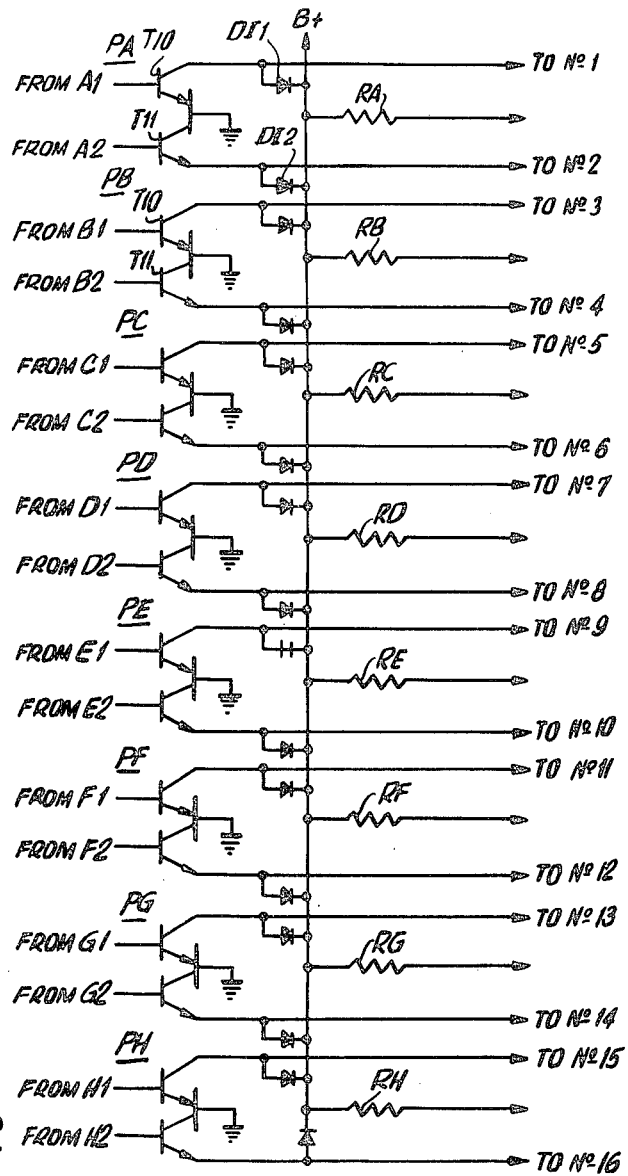
FIG. 12 is a schematic diagram illustrating details of a driver according to another embodiment of the invention.
Figure 21:
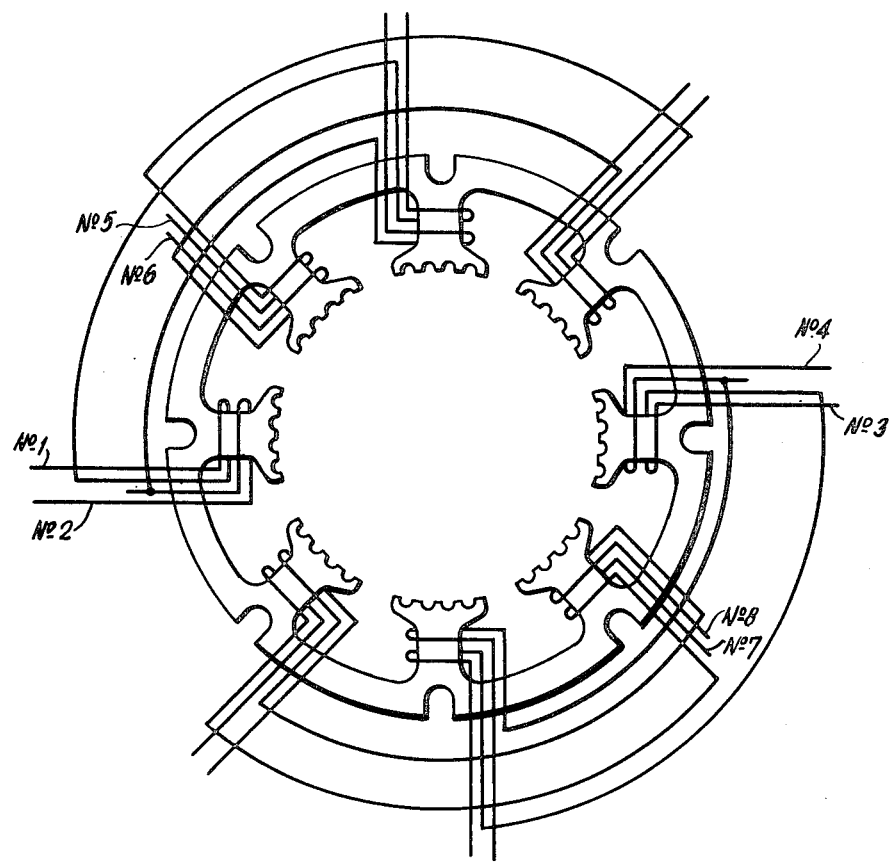
FIG. 21 is a schematic illustration of another motor with windings connected according to another embodiment of the invention.

According to another embodiment of the invention, an eight phase unipolar drive is used as shown in FIG. 21. Here, the only the portions PA through PD of FIG. 12 are connected to the correspondingly designated terminations of FIGS. 21 and 7. With the switch S1 closed, this produces the unipolar energization shown in FIG. 22 and results in the rotor moving ¼ step per pulse.

Opening the switch S1 produces the energization shown in FIG. 23 and results in ½ step of rotor rotation per pulse.

Adding the circuit of FIG. 15 while keeping switch S1 closed with switch S2 open produces the energization shown in FIG. 24 and results in a full step per pulse 98.

Figure 27:
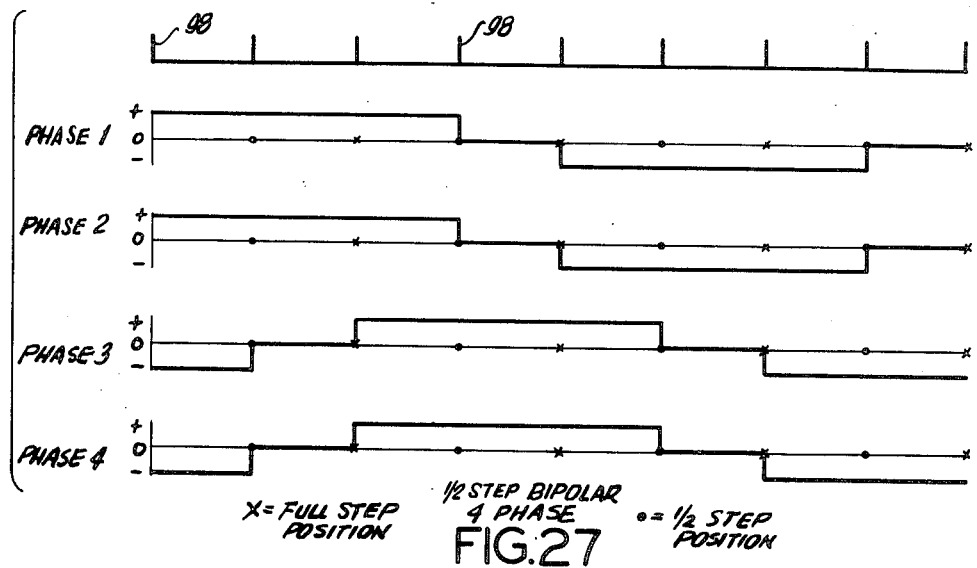
Figure 28:
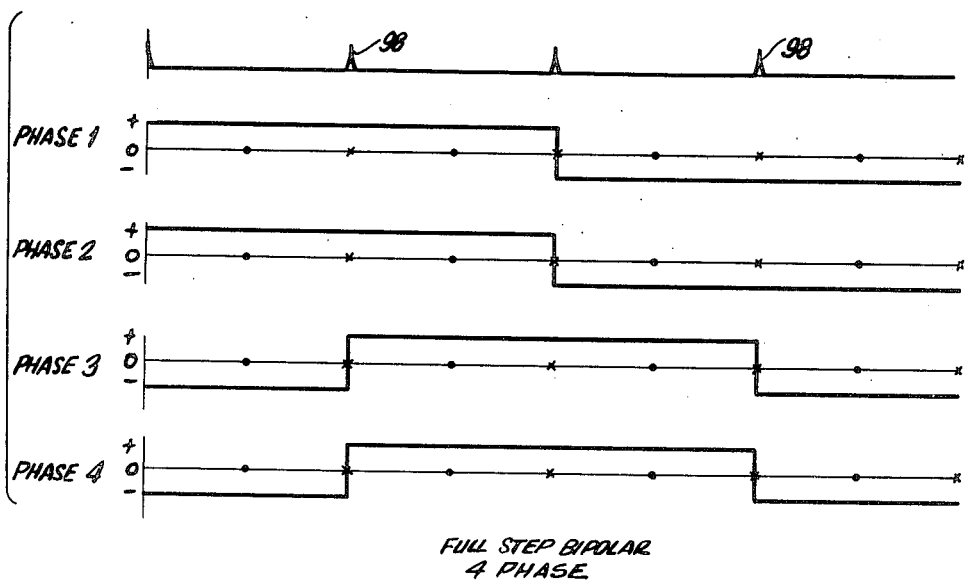

FIG. 25 illustrates another embodiment of the invention. Here, two circuits such as those shown in FIG. 10 connects the correspondingly identified winding ends to the windings A1 to B2 of FIG. 9. With the switch S1 closed, the energization shown in FIG. 26 is produced. This results in ¼ step rotation of the rotor. Opening switch S1 produces the energization shown in FIG. 27 and results in half steps. Full steps result from adding the circuit in FIG. 15 and opening switch S2 while closing switch S3. The full step energization is shown in FIG. 28.

The invention affords the possibility of stepping the motor at a plurality of angles. It gives finer resolution than heretofore, limits vibration and controls resonances although the reason for the latter is not yet established.

Furthermore, it permits large currents and powers to be applied to the collective windings with comparatively small transistors. For example, in the ⅛ step unipolar 16 phase arrangement of FIGS. 11 and 12 whose voltages are illustrated in FIG. 13A, eight to sixteen of thirty-two transistors simultaneously share the conduction of the total motor current. If the same total current were to be applied to a two-phase winding one or two transistors would have to carry this total current. Either the transistors would have to possess a larger current capability, or complex or wasteful balancing circuitry would be needed to distribute the current among several transistors. Transistors could not simply be connected in parallel because the differences in the transistor characteristics would cause one transistor to carry substantially more than its share of current and possibly burn out. The only way of avoiding such burn-out would be to use transistors having capabilities of carrying a far greater share of the current than expected. This is, of course a wasteful procedure. The invention avoids such waste and offers means for applying extensive power to the motor through a number of of transistors.

As a further point, the current carrying capacity of ordinarily available transistors is limited. This would normally limit the amount of current and power capable of being delivered to a motor. Hence the sizes of known stepping motors are quite small. The invention obviates the power limit of stepping motors by permitting current to be shared by a number of high-power transistors. In effect, the invention permits multiplication of power to a stepping motor and hence permits the manufacture of high power stepping motors.

While embodiments of the invention have been shown in detail, it will be evident that the invention may be embodied otherwise without departing from its spirit and scope.

What is claimed is:

1. A synchronous motor system responsive to input pulses, comprising a motor including a stator and a rotor movable relative to each other about a common axis, said stator having a plurality of radially directed stator poles, said poles having stator teeth arranged in a circle around the axis, said rotor having a plurality of rotor teeth arranged about the axis, said rotor teeth being permanently magnetized, a plurality of winding means on said stator poles for inducing magnetic fields in said poles in radial directions, each of said poles having at least one winding; and circuit means coupled to said winding means and responsive to input pulses, said circuit means including a plurality of switches each connected in series with one of said winding means; said circuit means including driver means coupled to said switches and responsive to the pulses for rendering a plurality of said switches conductive simultaneously and energizing said connected winding means simultaneously so that each switch when conductive carries only the current for inducing magnetism in one pole, and so that the pulses energizing the windings all have levels of substantially the same absolute value.

2. A system as in claim 1, wherein said switches are semiconductor switches and the plurality of poles is equal to four or more poles.

3. A synchronous motor system responsive to input pulses, comprising a motor including a stator and a rotor movable relative to each other about a common axis, said stator having a plurality of radially directed stator poles, said poles having stator teeth arranged in a circle around the axis, said rotor having a plurality of rotor teeth arranged about the axis, said rotor teeth being permanently magnetized, a plurality of winding means on said stator poles for inducing magnetic fields in said poles in radial directions, each of said poles having at least one winding; and circuit means coupled to said winding means and responsive to input pulses, said circuit means including a plurality of switches each connected in series with one of said winding means, each of said windings being wound around a single one of said poles said circuit means including driver means coupled to said switches and responsive to the pulses for rendering a plurality of said switches conductive simultaneously and energizing said connected winding means simultaneously, and means for connecting each of said winding means in series with only one of said switches and so that the pulses energizing the windings all have levels of substantially the same absolute value.

4. A system as in claim 3, wherein the number of poles and windings and switches is each eight and said driver means renders at least four of the ones of said switches in series with the windings conductive simultaneously.

5. A system as in claims 1 or 3, wherein said driving means is arranged for rendering a plurality of switches conductive simultaneously so as to energize windings on opposing poles of a pair simultaneously and thereby induce magnetic fields in said opposing poles in radial directions simultaneously.

6. A system as in claim 1, wherein said rotor teeth are divided into two axially displaced sets each magnetized in a different direction.

7. A system as in claim 1, wherein the number of poles is even.

8. A synchronous motor system responsive to input pulses, comprising a motor including a stator and a rotor movable relative to each other about a common axis, said stator having a plurality of radially directed stator poles, said poles having stator teeth arranged in a circle around the axis, said rotor having a plurality of rotor teeth arranged about the axis, said rotor having permanent magnetizing means for providing a continuous magnetization to said rotor teeth, each of said stator poles having one winding for inducing magnetic fields in said poles in radial directions, the number of said stator poles being even and equal to eight or more and forming opposing pairs, circuit means coupled to said winding means and responsive to said input pulses, said circuit means including a plurality of switches each connected in series with one of said windings, said circuit means including driving means coupled to said switches and responsive to the pulses for rendering a plurality of switches conductive simultaneously so as to energize windings on opposing poles of a pair simultaneously and thereby induce magnetic fields in said opposing poles in radial directions simultaneously and so that each switch when conductive carries only the current for inducing magnetism in one pole, and so that the pulses energizing the windings all have levels of substantially the same absolute value.

* * * * *